(12) United States Patent
Scheib et al.

(10) Patent No.: US 12,544,165 B2
(45) Date of Patent: Feb. 10, 2026

(54) REMOTELY DRIVEN CAMERA IN ROBOTIC SYSTEM

(71) Applicant: Auris Health, Inc., Redwood City, CA (US)

(72) Inventors: Charles J. Scheib, Loveland, OH (US); Clinton Denlinger, Cincinnati, OH (US)

(73) Assignee: Auris Health, Inc., Santa Clara, CA (US)

( * ) Notice: Subject to any disclaimer, the term of this patent is extended or adjusted under 35 U.S.C. 154(b) by 663 days.

(21) Appl. No.: 17/941,057

(22) Filed: Sep. 9, 2022

(65) Prior Publication Data
US 2024/0081932 A1   Mar. 14, 2024

(51) Int. Cl.
*A61B 90/50* (2016.01)
*A61B 34/00* (2016.01)
*A61B 34/37* (2016.01)
*A61B 17/00* (2006.01)
*A61B 34/30* (2016.01)

(52) U.S. Cl.
CPC ............... *A61B 34/37* (2016.02); *A61B 34/70* (2016.02); *A61B 2017/00477* (2013.01); *A61B 2034/305* (2016.02)

(58) Field of Classification Search
CPC ................... A61B 34/37; A61B 34/70; A61B 2017/00477; A61B 2034/305; A61B 90/361; A61B 17/3417; A61B 17/3421; A61B 50/13; A61B 2017/2927; A61B 17/34; A61B 2034/302; A61B 2090/571; A61B 34/30; A61B 34/74; A61B 2034/301
See application file for complete search history.

(56) References Cited

U.S. PATENT DOCUMENTS

| | | |
|---|---|---|
| 5,419,311 A | 5/1995 | Yabe et al. |
| 9,326,822 B2 | 5/2016 | Lewis et al. |
| 9,737,371 B2 | 8/2017 | Romo et al. |
| 10,182,875 B2 * | 1/2019 | Yates ............... A61B 90/03 |
| 10,667,871 B2 | 6/2020 | Romo et al. |
| 10,792,069 B2 | 10/2020 | Hall et al. |
| 10,820,924 B2 | 11/2020 | Hall et al. |
| 10,856,724 B2 | 12/2020 | Miller |
| 10,939,937 B2 | 3/2021 | Terefe et al. |
| 10,945,904 B2 | 3/2021 | Ruiz |
| 11,179,213 B2 | 11/2021 | Huang et al. |
| 11,197,728 B2 | 12/2021 | DeFonzo et al. |
| 11,246,672 B2 | 2/2022 | Landey et al. |

(Continued)

OTHER PUBLICATIONS

U.S. Appl. No. 17/941,059.
(Continued)

*Primary Examiner* — Masud Ahmed
(74) *Attorney, Agent, or Firm* — FBT Gibbons

(57) ABSTRACT

A system includes a controller, a robotic arm in communication with the controller and having a head, and a surgical scope coupled with the head and having a scope shaft sized and configured to be inserted through an opening in a body wall and into a body cavity of a patient. The controller is programmed to control the robotic arm to manipulate the surgical scope relative to the patient while inhibiting the head from entering a predefined zone of a robotic arm workspace that overlies the body wall.

20 Claims, 13 Drawing Sheets

(56) References Cited

U.S. PATENT DOCUMENTS

| | | |
|---|---|---|
| 11,432,709 B2 | 9/2022 | Yoshinaga et al. |
| 11,633,211 B2 | 4/2023 | Muthuchidambaram et al. |
| 11,744,654 B2 | 9/2023 | Rohr Daniel et al. |
| 12,329,467 B2 * | 6/2025 | Shelton, IV ............ A61B 34/76 |
| 12,426,772 B2 | 9/2025 | Scheib et al. |
| 2008/0287963 A1 | 11/2008 | Rogers et al. |
| 2012/0016191 A1 | 1/2012 | Ito et al. |
| 2013/0197535 A1 | 8/2013 | Okada |
| 2014/0277334 A1 | 9/2014 | Yu et al. |
| 2016/0199140 A1 | 7/2016 | Gombert et al. |
| 2019/0328599 A1 * | 10/2019 | Mahoney ............... A61B 34/30 |
| 2019/0350660 A1 | 11/2019 | Moll et al. |
| 2020/0276416 A1 | 9/2020 | Wheeler |
| 2021/0343088 A1 * | 11/2021 | Payyavula ............ A61B 1/0676 |
| 2021/0378752 A1 * | 12/2021 | Paul ........................ A61B 34/20 |
| 2021/0401527 A1 | 12/2021 | Hassan |
| 2022/0031422 A1 * | 2/2022 | Wood ................. A61B 1/00193 |
| 2022/0304549 A1 | 9/2022 | Iijima |
| 2023/0020346 A1 | 1/2023 | Yardibi et al. |
| 2023/0202040 A1 | 6/2023 | Lin et al. |
| 2023/0371793 A1 | 11/2023 | Magno et al. |
| 2024/0000528 A1 | 1/2024 | Lin et al. |
| 2024/0081627 A1 | 3/2024 | Scheib et al. |
| 2024/0081922 A1 | 3/2024 | Leclere et al. |
| 2024/0081942 A1 | 3/2024 | Scheib et al. |
| 2024/0206711 A1 | 6/2024 | Scheib et al. |
| 2024/0206993 A1 | 6/2024 | Leclere et al. |

OTHER PUBLICATIONS

U.S. Appl. No. 17/941,062.
U.S. Appl. No. 17/941,063.
U.S. Appl. No. 17/941,059, filed Sep. 9, 2022 by Leclere et al., entitled: "Flexible Articulating Introducer Cannula for Surgical Scope in Robotic System."
U.S. Appl. No. 17/941,062, filed Sep. 9, 2022 by Scheib et al., entitled: "Bent Introducer Cannula for Surgical Scope in Robotic System."
U.S. Appl. No. 17/941,063, filed Sep. 9, 2022 by Scheib et al., entitled: "Articulating Introducer Cannula for Surgical Scope in Robotic System."

* cited by examiner

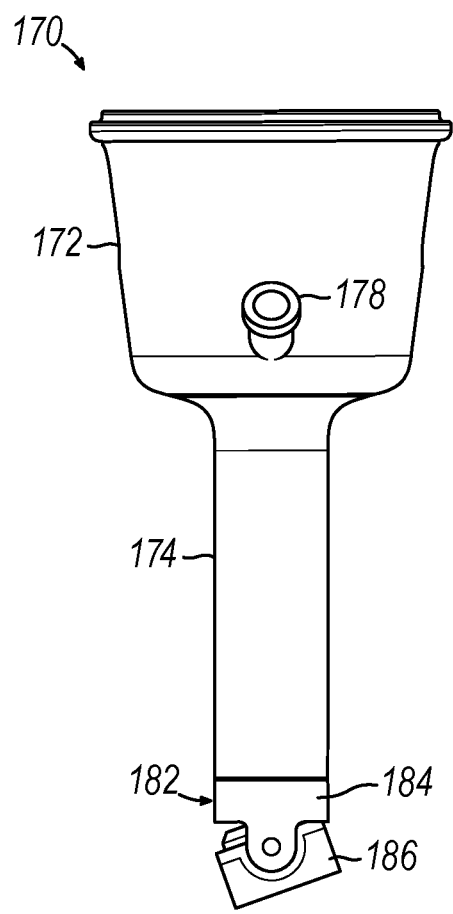
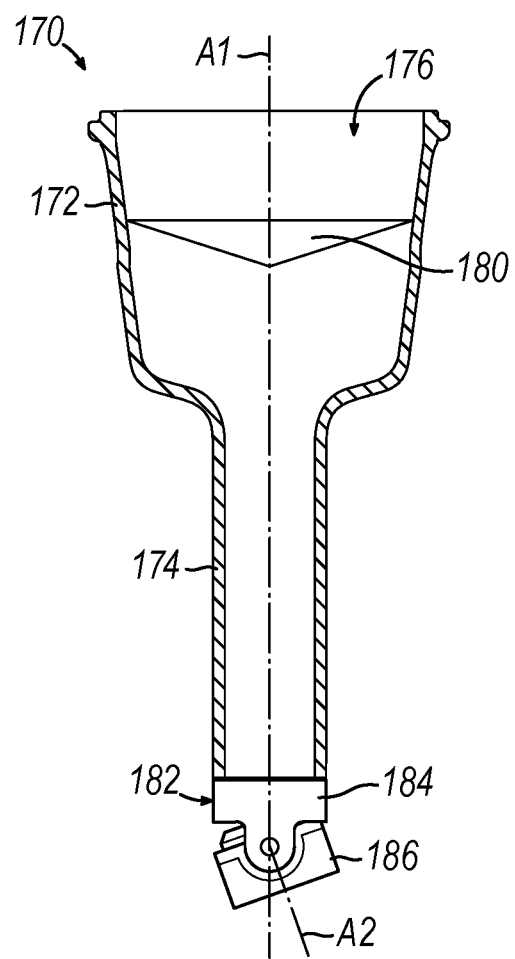
FIG. 10     FIG. 11

REMOTELY DRIVEN CAMERA IN ROBOTIC SYSTEM

BACKGROUND

A variety of surgical instruments include an end effector for use in conventional medical treatments and procedures conducted by a medical professional operator, as well as applications in robotically assisted surgeries. Such surgical instruments may be directly gripped and manipulated by a surgeon or incorporated into robotically assisted surgery. In the case of robotically assisted surgery, the surgeon may operate a master controller to remotely control the motion of such surgical instruments at a surgical site. The controller may be separated from the patient by a significant distance (e.g., across the operating room, in a different room, or in a completely different building than the patient). Alternatively, a controller may be positioned quite near the patient in the operating room. Regardless, the controller may include one or more hand input devices (such as joysticks, exoskeletal gloves, master manipulators, or the like), which are coupled by a servo mechanism to the surgical instrument. In one example, a servo motor moves a manipulator supporting the surgical instrument based on the surgeon's manipulation of the hand input devices. During the surgery, the surgeon may employ, via a robotic surgical system, a variety of surgical instruments including an ultrasonic blade, a surgical stapler, a tissue grasper, a needle driver, an electrosurgical cautery probe, etc. Each of these structures performs functions for the surgeon, for example, cutting tissue, coagulating tissue, holding or driving a needle, grasping a blood vessel, dissecting tissue, cauterizing tissue, and/or other functions.

While several robotic surgical systems and associated components have been made and used, it is believed that no one prior to the inventors has made or used the invention described in the appended claims.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

FIG. 10 depicts a side elevational view of the cannula of FIG. 8, showing the articulation feature in an articulated state;

FIG. 11 depicts a side cross-sectional view of the cannula of FIG. 8 with the articulation feature in an articulated state;

Figure 1:
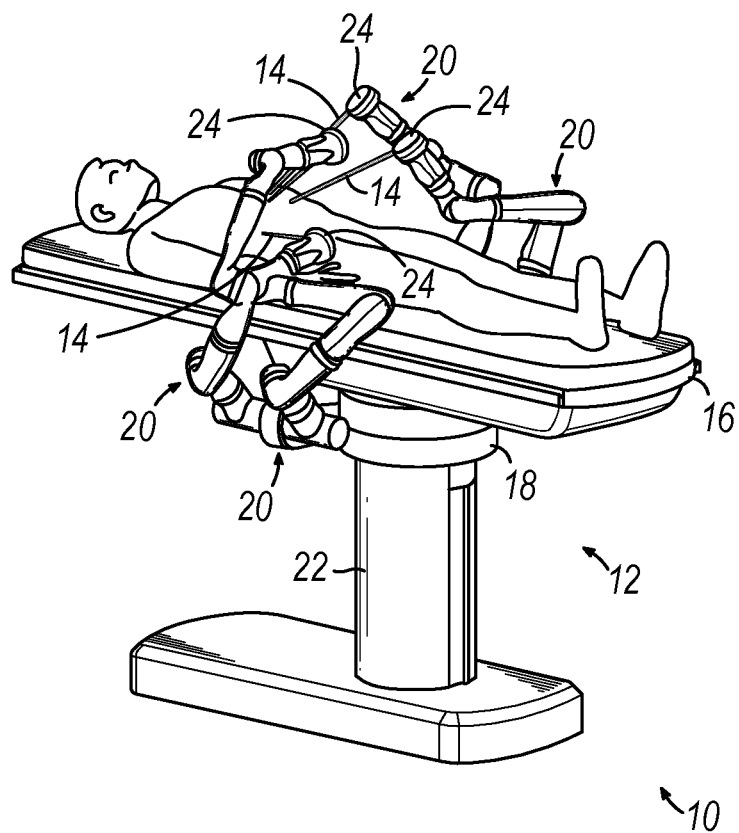
FIG. 1 depicts a perspective view of a first example of a robotic system configured for a laparoscopic procedure.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

For clarity of disclosure, the terms "proximal" and "distal" are defined herein relative to a human or robotic operator of the surgical instrument. The term "proximal" refers the position of an element closer to the human or robotic operator of the surgical instrument and further away from the surgical end effector of the surgical instrument. The term "distal" refers to the position of an element closer to the surgical end effector of the surgical instrument and further away from the human or robotic operator of the surgical instrument. It will be further appreciated that, for convenience and clarity, spatial terms such as "side," "upwardly," and "downwardly" also are used herein for reference to relative positions and directions. Such terms are used below with reference to views as illustrated for clarity and are not intended to limit the invention described herein.

Aspects of the present examples described herein may be integrated into a robotically-enabled medical system, including as a robotic surgical system, capable of performing a variety of medical procedures, including both minimally invasive, such as laparoscopy, and non-invasive, such as endoscopy, procedures. Among endoscopy procedures, the robotically-enabled medical system may be capable of performing bronchoscopy, ureteroscopy, gastroscopy, etc.

In addition to performing the breadth of procedures, the robotically-enabled medical system may provide additional benefits, such as enhanced imaging and guidance to assist the medical professional. Additionally, the robotically-enabled medical system may provide the medical professional with the ability to perform the procedure from an ergonomic position without the need for awkward arm motions and positions. Still further, the robotically-enabled medical system may provide the medical professional with the ability to perform the procedure with improved ease of use such that one or more of the instruments of the robotically-enabled medical system may be controlled by a single operator.

I. Example of Robotically-Enabled Medical System

FIG. 1 shows an example of a robotically-enabled medical system, including a first example of a robotic system (10). Robotic system (10) of the present example includes a table system (12) operatively connected to a surgical instrument (14) for a diagnostic and/or therapeutic procedure in the course of treating a patient. Such procedures may include, but are not limited to, bronchoscopy, ureteroscopy, a vascular procedure, and a laparoscopic procedure. To this end, surgical instrument (14) is configured for a laparoscopic procedure, although it will be appreciated that any instrument for treating a patient may be similarly used. At least part of robotic system (10) may be constructed and operable in accordance with at least some of the teachings of any of the various patents, patent application publications, and patent applications that are cited herein.

A. Example of Robotic System with Annular Carriage

As shown in FIG. 1, robotic system (10) includes table system (12) having a platform, such as a table (16), with a plurality of carriages (18) which may also be referred to herein as "arm supports," respectively supporting the deployment of a plurality of robotic arms (20). Robotic system (10) further includes a support structure, such as a column (22), for supporting table (16) over the floor. Table (16) may also be configured to tilt to a desired angle during use, such as during laparoscopic procedures. Each robotic arm (20) includes an instrument driver (24) configured to removably connect to and manipulate surgical instrument (14) for use. In alternative examples, instrument drivers (24) may be collectively positioned in a linear arrangement to support the instrument extending therebetween along a "virtual rail" that may be repositioned in space by manipulating the one or more robotic arms (20) into one or more angles and/or positions. In practice, a C-arm (not shown) may be positioned over the patient for providing fluoroscopic imaging.

In the present example, column (22) includes carriages (18) arranged in a ring-shaped form to respectively support (18) one or more robotic arms (20) for use. Carriages (18) may translate along column (22) and/or rotate about column (22) as driven by a mechanical motor (not shown) positioned within column (22) in order to provide robotic arms (20) with access to multiples sides of table (16), such as, for example, both sides of the patient. Rotation and translation of carriages (18) allows for alignment of instruments, such as surgical instrument (14), into different access points on the patient. In alternative examples, such as those discussed below in greater detail, robotic system (10) may include a surgical bed with adjustable arm supports including a bar (26) (see FIG. 2) extending alongside. One or more robotic arms (20) may be attached to carriages (18) (e.g., via a shoulder with an elbow joint). Robotic arms (20) are vertically adjustable so as to be stowed compactly beneath table (16), and subsequently raised during use.

Robotic system (10) may also include a tower (not shown) that divides the functionality of robotic system (10) between table (16) and the tower to reduce the form factor and bulk of table (16). To this end, the tower may provide a variety of support functionalities to table (16), such as computing and control capabilities, power, fluidics, optical processing, and/or sensor data processing. The tower may also be movable so as to be positioned away from the patient to improve medical professional access and de-clutter the operating room. The tower may also include a master controller or console that provides both a user interface for operator input, such as keyboard and/or pendant, as well as a display screen, including a touchscreen, for pre-operative and intra-operative information, including, but not limited to, real-time imaging, navigation, and tracking information. In some versions, the tower may include gas tanks to be used for insufflation.

B. Example of Robotic System with Bar Carriage

Figure 2:
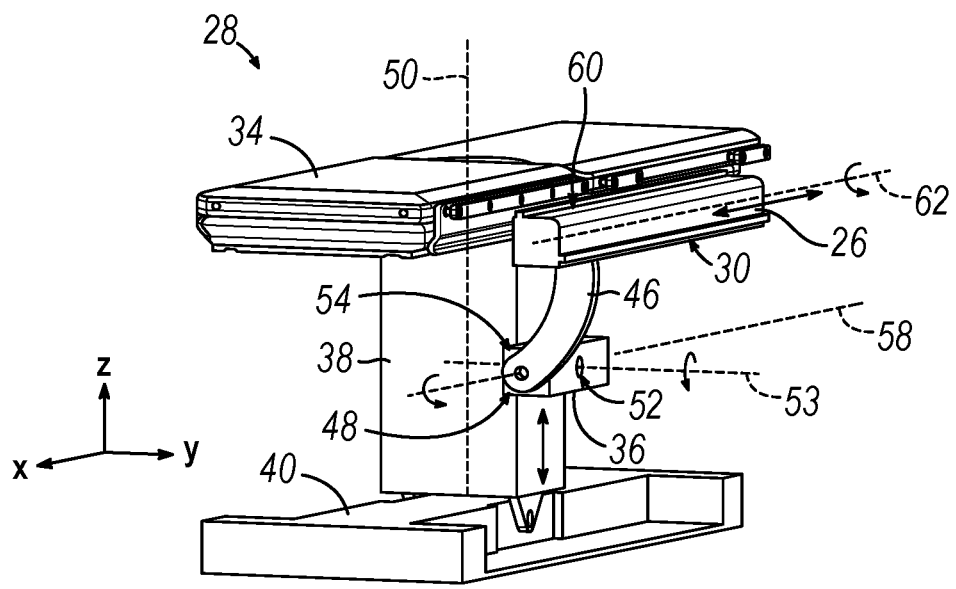
FIG. 2 depicts a perspective view of a second example of a robotic system.
Figure 3:
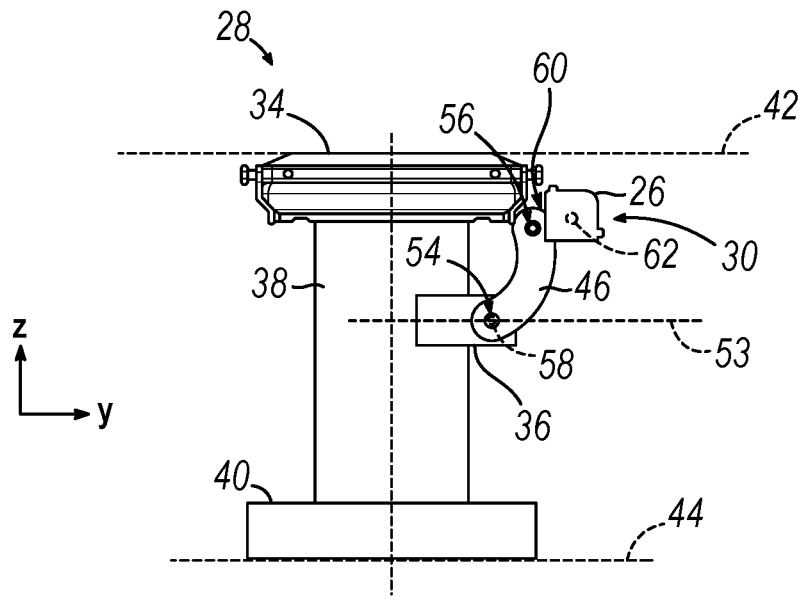
FIG. 3 depicts an end elevational view of the robotic system of FIG. 2.
Figure 4:
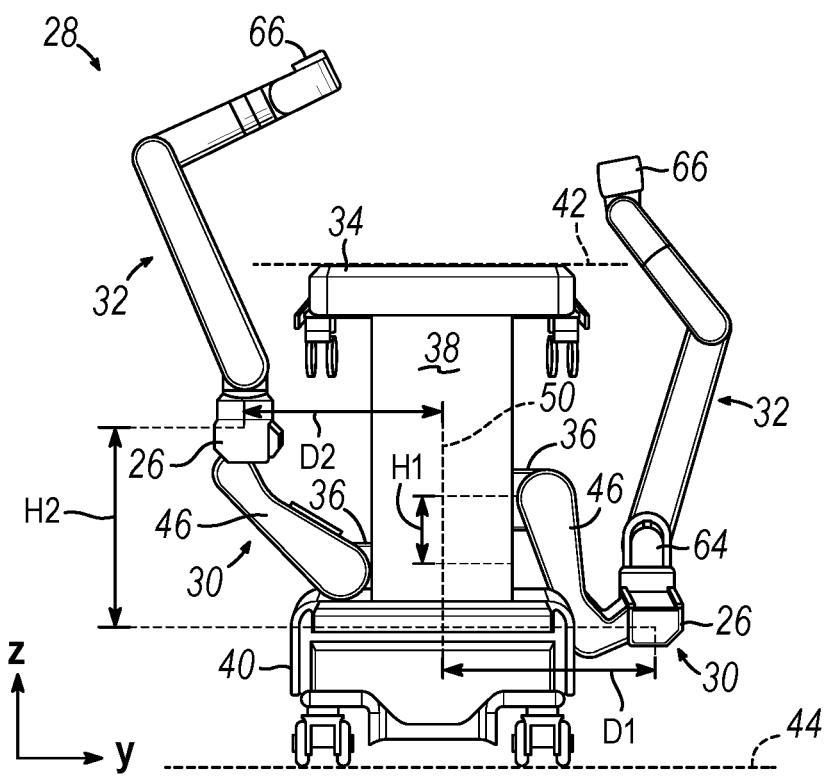
FIG. 4 depicts the end elevational view of the robotic system of FIG. 2 including an example of a pair of robotic arms.

FIGS. 2-4 show another example of a robotic system (28). Robotic system (28) of this example includes one or more adjustable arm supports (30) including bars (26) that are configured to support one or more robotic arms (32) relative to a table (34). In the present example, a single adjustable arm support (30) (FIGS. 2-3) and a pair of adjustable arm supports (30) (FIG. 4) are shown, though additional arm supports (30) may be provided about table (34). Each adjustable arm support (30) is configured to selectively move relative to table (34) so as to alter the position of adjustable arm support (30), and/or any robotic arms (32) mounted thereto, relative to table (34) as desired. Such adjustable arm supports (30) may provide high versatility to robotic system (28), including the ability to easily stow one or more adjustable arm supports (30) with robotic arms (32) beneath table (34).

Each adjustable arm support (30) provides several degrees of freedom, including lift, lateral translation, tilt, etc. In the present example shown in FIGS. 2-4, arm support (30) is configured with four degrees of freedom, which are illustrated with arrows. A first degree of freedom allows adjustable arm support (30) to move in the z-direction ("Z-lift"). For example, adjustable arm support (30) includes a vertical carriage (36). Vertical carriage (36) is configured to move up or down along or relative to a column (38) and a base (40), both of which support table (34). A second degree of freedom allows adjustable arm support (30) to tilt about an axis extending in the y-direction. For example, adjustable arm support (30) includes a rotary joint, which allows adjustable arm support (30) to align with table (34) when table (34) is in a Trendelenburg position or other inclined position. A third degree of freedom allows adjustable arm support (30) to "pivot up" about an axis extending in the x-direction, which may be useful to adjust a distance between a side of table (34) and adjustable arm support (30). A fourth degree of freedom allows translation of adjustable arm support (30) along a longitudinal length of table (34), which extends along the x-direction. Base (40) and column (38) together support table (34) relative to a support surface, which is shown along a support axis (42) above a floor axis (44) in the present example. While the present example shows adjustable arm support (30) mounted to column (38), arm support (30) may alternatively be mounted to table (34) or base (40).

As shown in the present example, adjustable arm support (30) includes vertical carriage (36), a bar connector (46), and bar (26). To this end, vertical carriage (36) attaches to column (38) by a first joint (48), which allows vertical carriage (36) to move relative to column (38) (e.g., such as up and down a first, vertical axis (50) extending in the z-direction). First joint (48) provides the first degree of freedom ("Z-lift") to adjustable arm support (30). Adjustable arm support (30) further includes a second joint (52), which provides the second degree of freedom (tilt) for adjustable arm support (30) to pivot about a second axis (53) extending in the y-direction. Adjustable arm support (30) also includes a third joint (54), which provides the third degree of freedom ("pivot up") for adjustable arm support (30) about a third axis (58) extending in the x-direction. Furthermore, an additional joint (56) mechanically constrains third joint (54) to maintain a desired orientation of bar (26) as bar connector (46) rotates about third axis (58). Adjustable arm support (30) includes a fourth joint (60) to provide a fourth degree of freedom (translation) for adjustable arm support (30) along a fourth axis (62) extending in the x-direction.

FIG. 4 shows a version of robotic system (28) with two adjustable arm supports (30) mounted on opposite sides of table (34). A first robotic arm (32) is attached to one such bar (26) of first adjustable arm support (30). This first robotic arm (32) includes a connecting portion (64) attached to a first bar (26). Similarly, a second robotic arm (32) includes a connecting portion (64) attached to the other bar (26). As shown in FIG. 4, vertical carriages (36) are separated by a first height (H1), and bar (26) is disposed a second height (H2) from base (40). The first bar (26) is disposed a first distance (D1) from vertical axis (50), and the other bar (26) is disposed a second distance (D2) from vertical axis (50). Distal ends of first and second robotic arms (32) respectively include instrument drivers (66), which are configured to attach to one or more instruments such as those discussed below in greater detail.

In some versions, one or more of robotic arms (32) has seven or more degrees of freedom. In some other versions, one or more robotic arms (32) has eight degrees of freedom, including an insertion axis (1-degree of freedom including insertion), a wrist (3-degrees of freedom including wrist pitch, yaw and roll), an elbow (1-degree of freedom including elbow pitch), a shoulder (2-degrees of freedom including shoulder pitch and yaw), and connecting portion (64) (1-degree of freedom including translation). In some versions, the insertion degree of freedom is provided by robotic arm (32); while in some other versions, an instrument such as surgical instrument includes an instrument-based insertion architecture.

Figure 5:
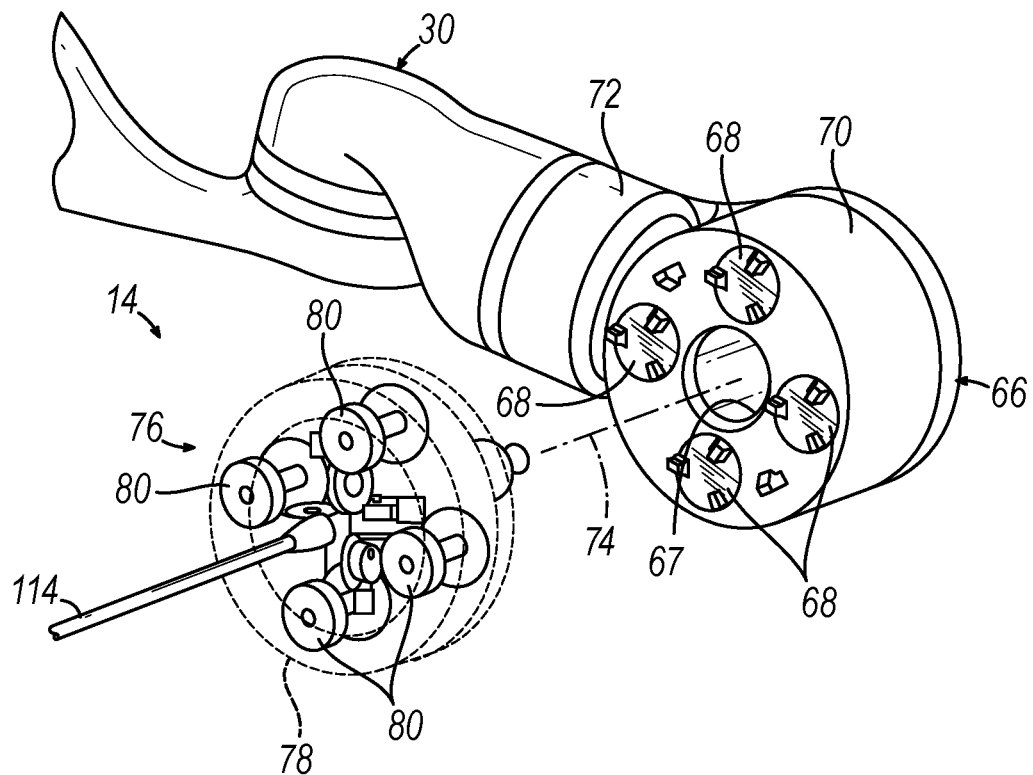
FIG. 5 depicts a partially exploded perspective view of the robotic arm of FIG. 4 having an instrument driver and an example of a surgical instrument.

FIG. 5 shows one example of instrument driver (66) in greater detail, with surgical instrument (14) removed therefrom. Given the present instrument-based insertion architecture shown with reference to surgical instrument (14), instrument driver (66) further includes a clearance bore (67) extending entirely therethrough so as to movably receive a portion of surgical instrument (14) as discussed below in greater detail. Instrument driver (66) may also be referred to herein as an "instrument drive mechanism," an "instrument device manipulator," or an "advanced device manipulator" (ADM). Instruments may be configured to be detached, removed, and interchanged from instrument driver (66) for individual sterilization or disposal by the medical professional or associated staff. In some scenarios, instrument drivers (66) may be draped for protection and thus may not need to be changed or sterilized.

Each instrument driver (66) operates independently of other instrument drivers (66) and includes a plurality of rotary drive outputs (68), such as four drive outputs (68), also independently driven relative to each other for directing operation of surgical instrument (14). Instrument driver (66) and surgical instrument (14) of the present example are aligned such that the axes of each drive output (68) are parallel to the axis of surgical instrument (14). In use, control circuitry (not shown) receives a control signal, transmits motor signals to desired motors (not shown), compares resulting motor speed as measured by respective encoders (not shown) with desired speeds, and modulates motor signals to generate desired torque at one or more drive outputs (68).

In the present example, instrument driver (66) is circular with respective drive outputs (68) housed in a rotational assembly (70). In response to torque, rotational assembly (70) rotates along a circular bearing (not shown) that connects rotational assembly (70) to a non-rotational portion (72) of instrument driver (66). Power and controls signals may be communicated from non-rotational portion (72) of instrument driver (66) to rotational assembly (70) through electrical contacts therebetween, such as a brushed slip ring connection (not shown). In one example, rotational assembly (70) may be responsive to a separate drive output (not shown) integrated into non-rotatable portion (72), and thus not in parallel to the other drive outputs (68). In any case, rotational assembly (70) allows instrument driver (66) to rotate rotational assembly (70) and drive outputs (68) in conjunction with surgical instrument (14) as a single unit around an instrument driver axis (74).

Figure 6A:
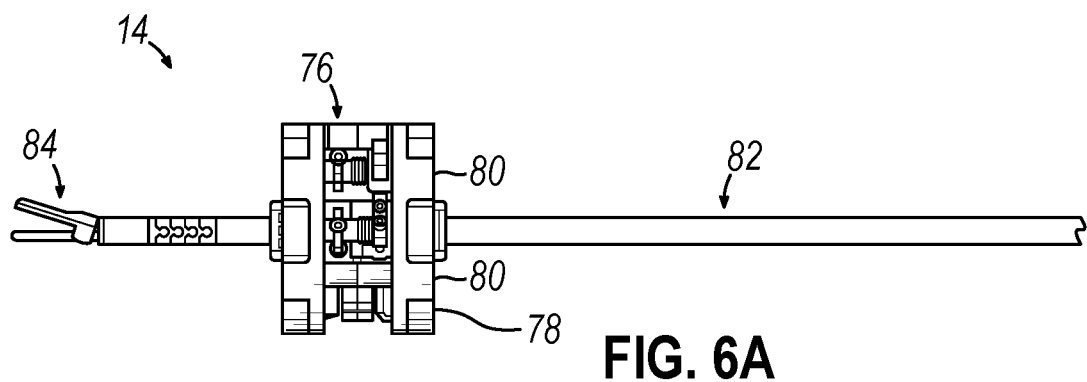
FIG. 6A depicts a side elevational view of the surgical instrument of FIG. 5 in a retracted position.
Figure 6B:
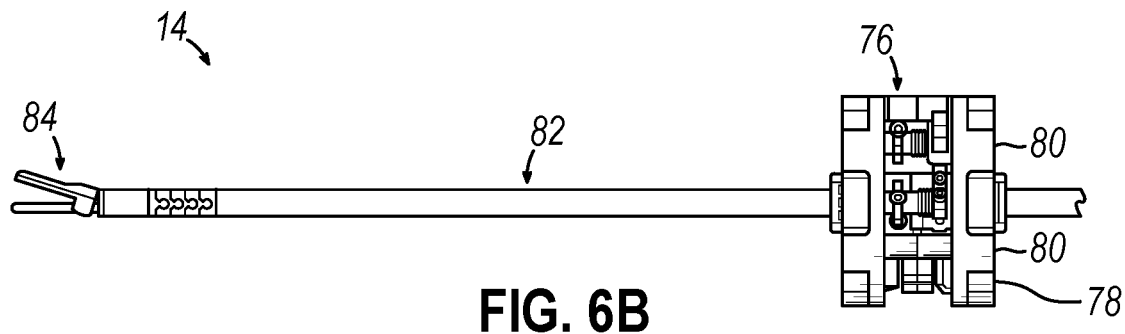
FIG. 6B depicts a side elevational view the surgical instrument of FIG. 5 in an extended position.

C. Example of Surgical Instrument with Instrument-Based Insertion Architecture FIGS. 5-6B show surgical instrument (14) having the instrument-based insertion architecture as discussed above. Surgical instrument (14) includes an elongated shaft assembly (82), an end effector (84) connected to and extending distally from shaft assembly (82), and an instrument base (76) (shown with a transparent external skin for discussion purposes) coupled to shaft assembly (82). Instrument base (76) includes an attachment surface (78) and a plurality of drive inputs (80) (such as receptacles, pulleys, and spools) configured to receive and couple with respective rotary drive outputs (68) of instrument driver (66). Insertion of shaft assembly (82) is grounded at instrument base (76) such that end effector (84) is configured to selectively move longitudinally from a retracted position (FIG. 6A) to an extended position (FIG. 6B), vice versa, and any desired longitudinal position therebetween. As used herein, the retracted position is shown in FIG. 6A and places end effector (84) relatively close and proximally toward instrument base (76); whereas the extended position is shown in FIG. 6B and places end effector (84) relatively far and distally away from instrument base (76). Insertion into and withdrawal of end effector (84) relative to the patient may thus be facilitated by surgical instrument (14), although it will be appreciated that such insertion into and withdrawal may also occur via adjustable arm supports (30) in one or more examples.

When coupled to rotational assembly (70) of instrument driver (66), surgical instrument (14), comprising instrument base (76) and instrument shaft assembly (82), rotates in combination with rotational assembly (70) about the instrument driver axis (74). Since instrument shaft assembly (82) is positioned at the center of instrument base (76), instrument shaft assembly (82) is coaxial with instrument driver axis (74) when attached. Thus, rotation of the rotational assembly (70) causes instrument shaft assembly (82) to rotate about its own longitudinal axis. Moreover, as instrument base (76) rotates with instrument shaft assembly (82), any tendons connected to drive inputs (80) of instrument base (76) are not tangled during rotation. Accordingly, the parallelism of the axes of rotary drive outputs (68), rotary drive inputs (80), and instrument shaft assembly (82) allows for the shaft rotation without tangling any control tendons, and clearance bore (67) provides space for translation of shaft assembly (82) during use.

The foregoing examples of surgical instrument (14) and instrument driver (66) are merely illustrative examples. Robotic arms (32) may interface with different kinds of instruments in any other suitable fashion using any other suitable kinds of interface features. Similarly, different kinds of instruments may be used with robotic arms (32), and such alternative instruments may be configured and operable differently from surgical instrument (14).

In addition to the foregoing, robotic systems (10, 28) may be configured and operable in accordance with at least some of the teachings of U.S. Pat. No. 9,737,371, entitled "Configurable Robotic Surgical System with Virtual Rail and Flexible Endoscope," issued Aug. 22, 2017, the disclosure of which is incorporated by reference herein, in its entirety; U.S. Pat. No. 10,945,904, entitled "Tilt Mechanisms for Medical Systems and Applications," issued Mar. 16, 2021, the disclosure of which is incorporated by reference herein, in its entirety; U.S. Pub. No. 2019/0350662, entitled "Controllers for Robotically-Enabled Teleoperated Systems," published Nov. 21, 2019, the disclosure of which is incorporated by reference herein, in its entirety; U.S. Pub. No. 2020/0085516, entitled "Systems and Methods for Concomitant Medical Procedures," published Mar. 19, 2020; and/or U.S. Pub. No. 2021/0401527, entitled "Robotic Medical Systems Including User Interfaces with Graphical Representations of User Input Devices," published Dec. 30, 2021, the disclosure of which is incorporated by reference herein, in its entirety.

II. Surgical Scope Having Deflectable Shaft

In robotically assisted laparoscopic procedures, it may be desirable to mount a surgical instrument in the form of a surgical scope, also referred to as a surgical camera or a laparoscope, to a robotic arm of the robotic system to provide real-time visualization of a target surgical site and surrounding anatomical structures with the patient's body cavity during the procedure. Some conventional surgical scopes implemented in robotic systems may include an elongate rigid base and an elongate rigid shaft extending distally from the base. The surgical scope may be mounted to the head of a robotic arm, where the head is also docked directly to a cannula through which the scope shaft is inserted to access the body cavity. This configuration may tend to result in the surgical scope and its robotic arm consuming valuable space in the workspace located directly above the patient. This may ultimately tend to restrict the range of motion of the surgical scope and other robotically-controlled surgical instruments operating within this workspace, thereby limiting the reach and access of the surgical scope and the surgical instruments and risking collision between these devices and their respective robotic arms in the workspace. Accordingly, it may be desirable to provide alternative configurations of surgical scopes that promote greater reach and access of the surgical scope and accompanying surgical instruments of a robotic system.

Figure 7:
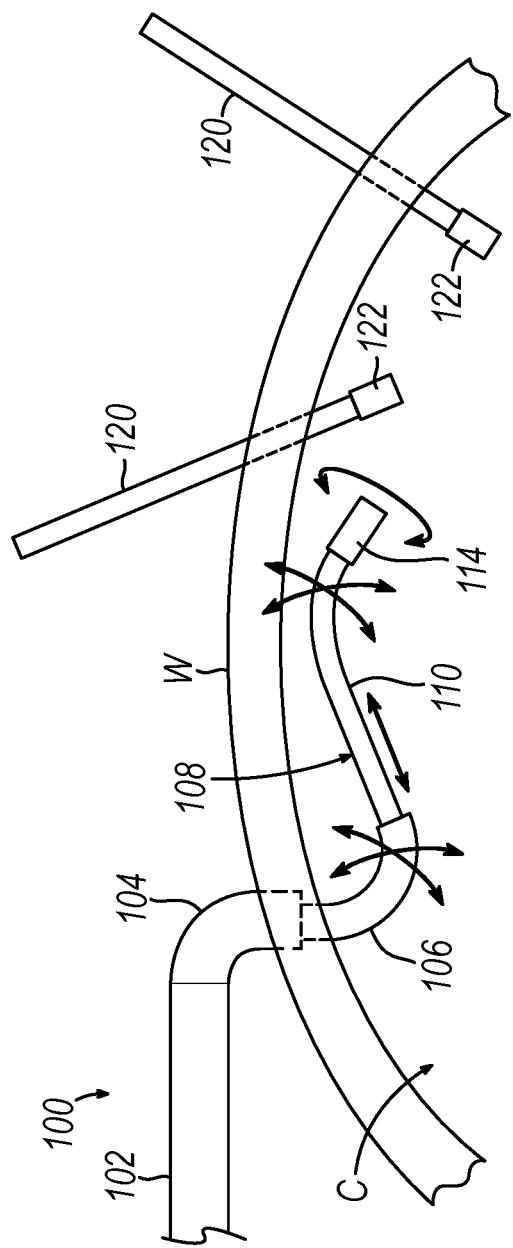
FIG. 7 depicts a schematic view of an example of a surgical scope and a pair of surgical instruments, showing a deflectable shaft portion of the surgical scope and distal ends of the surgical instruments inserted through a body wall and into a body cavity of a patient.

FIG. 7 shows an example of a surgical scope (100) that is constructed such that a portion of surgical scope (100) is non-rigid, thus enabling a base (not shown) of surgical scope (100) and its corresponding robotic arm (not shown) to be positioned remotely from the location at which the surgical scope enters through the body wall (W) and into a body cavity (C) of a patient, such as an abdominal cavity. Surgical scope (100) includes an elongate outer sheath (102) (also referred to as an "outer tube"), which may be rigid or deflectable; and a curved joint (104) at a distal end of outer sheath (102), which may also be rigid with a predefined curvature or deflectable and configured to assume a curved state as shown. As used herein, the term "deflectable" encompasses configurations that are configured to deflect relative to an initial axis, including configurations that are resiliently flexible, malleable, and/or articulatable (e.g., with a plurality of interconnected rigid links), for example. Though not shown, a proximal end of outer sheath (102) is coupled with a scope base that may be mounted to and controlled by a motorized drive mechanism (e.g., similar to instrument driver (66)) of a robotic arm.

Surgical scope (100) further includes a deflectable distal sheath (106) that extends distally from a distal end of outer sheath (102), and a scope shaft (108) that is slidably disposed within outer sheath (102) and distal sheath (106). Scope shaft (108) includes a deflectable distal shaft portion (110) (also referred to as a "leader") having an articulation section (112) and a distal tip section (114). Distal tip section (114) includes an optical module having a distally facing lens (not shown) configured to provide visualization of a target surgical site within body cavity (C). The deflectable construction of deflectable distal shaft portion (110) enables it to conform to the curvatures of curved joint (104) and distal sheath (106) as scope shaft (108) slidably advances and retracts relative to outer sheath (102) and distal sheath (106). In some versions, scope shaft (108) may further include a rigid proximal shaft portion that is directly connected to deflectable distal shaft portion (110) and that facilitates insertion and retraction of scope shaft (108). Additionally, in some other versions distal sheath (106) may be an independent structure and used with surgical scope (100).

In the present version, distal sheath (106) and scope shaft (108) cooperate to provide surgical scope (100) with six degrees of freedom, as illustrated by respective arrows in FIG. 7. Specifically, first and second degrees of freedom are provided by the ability of distal sheath (106) to articulate in first and second planes that perpendicularly intersect one another, thus providing pitch and yaw at distal sheath (106). By way of example only, one or more pull-wires, drive bands, and/or other actuation members may be used to drive articulation of distal sheath (106). A third degree of freedom is provided by the ability of scope shaft (108) to longitudinally advance and retract relative to distal sheath (106) and outer sheath (102). Fourth and fifth degrees of freedom are provided by the ability of the deflectable distal shaft portion (110) to articulate at articulation section (112) in first and second planes that perpendicularly intersect one another, thus providing pitch and yaw at articulation section (112). By way of example only, one or more pull-wires, drive bands, and/or other actuation members may be used to drive articulation of distal shaft portion (110). A sixth degree of freedom is provided by the ability of distal tip section (114) to rotate about its longitudinal axis relative to a proximal remainder of deflectable distal shaft portion (110), thus providing roll at distal tip section (114). In some other versions, the components of surgical scope (100) may be modified to include more or fewer (e.g., zero) articulation sections, each of which may be configured to articulate in one or more planes, to provide any desired quantity and arrangement of degrees of freedom. By way of example only, in other versions scope shaft (108) may include zero or two or more articulation sections (112), each configured to articulate in one or more intersecting planes.

In use, a surgeon may first create an incision in body wall (W), for example at the umbilicus, to provide access to a target surgical site located within body cavity (C). One or more other surgical instruments (120) may be inserted through body wall (W) at separate locations, for example each with a surgical cannula or other surgical access device. Each surgical instrument (120) may be mounted to a respective robotic arm and includes an end effector (122) (shown schematically) that is operable to grasp tissue, cut tissue, staple tissue, seal tissue, and/or provide other functionality at the target surgical site. Distal sheath (106) of surgical scope (100) is inserted distally through the incision in body wall (W) into body cavity (C) while outer sheath (102) remains supported by a respective robotic arm. Surgical scope (100) may then be actuated, for example by a drive mechanism of the respective robotic arm, to advance scope shaft (108) distally through outer sheath (102) and distal sheath (106) and into body cavity (C), such that distal sheath (106) serves as an introducer cannula. Before, during, or after advancement of scope shaft (108), distal sheath (106) may be articulated by the drive mechanism to a desired articulated state. Additionally, upon exiting distal sheath (106) and entering body cavity (C), articulation section (112) of scope shaft (108) may be driven by the drive mechanism to orient distal tip section (114) in a desired direction. Additionally, distal tip section (114) may be rotated relative to the proximal remainder of scope shaft (108) to provide desired visualization within body cavity (C).

III. Surgical Cannula Having Distal Articulation Joint

As described above, distal sheath (106) of surgical scope (100) may be configured to articulate in one or more planes to facilitate positioning of distal tip section (114) within body cavity (C) for optimal visualization of a target surgical site and surrounding anatomical structures. In some instances, it may be desirable to combine a deflectable surgical scope with a surgical cannula having a distal articulation feature in the form of an articulation joint.

Figure 8:
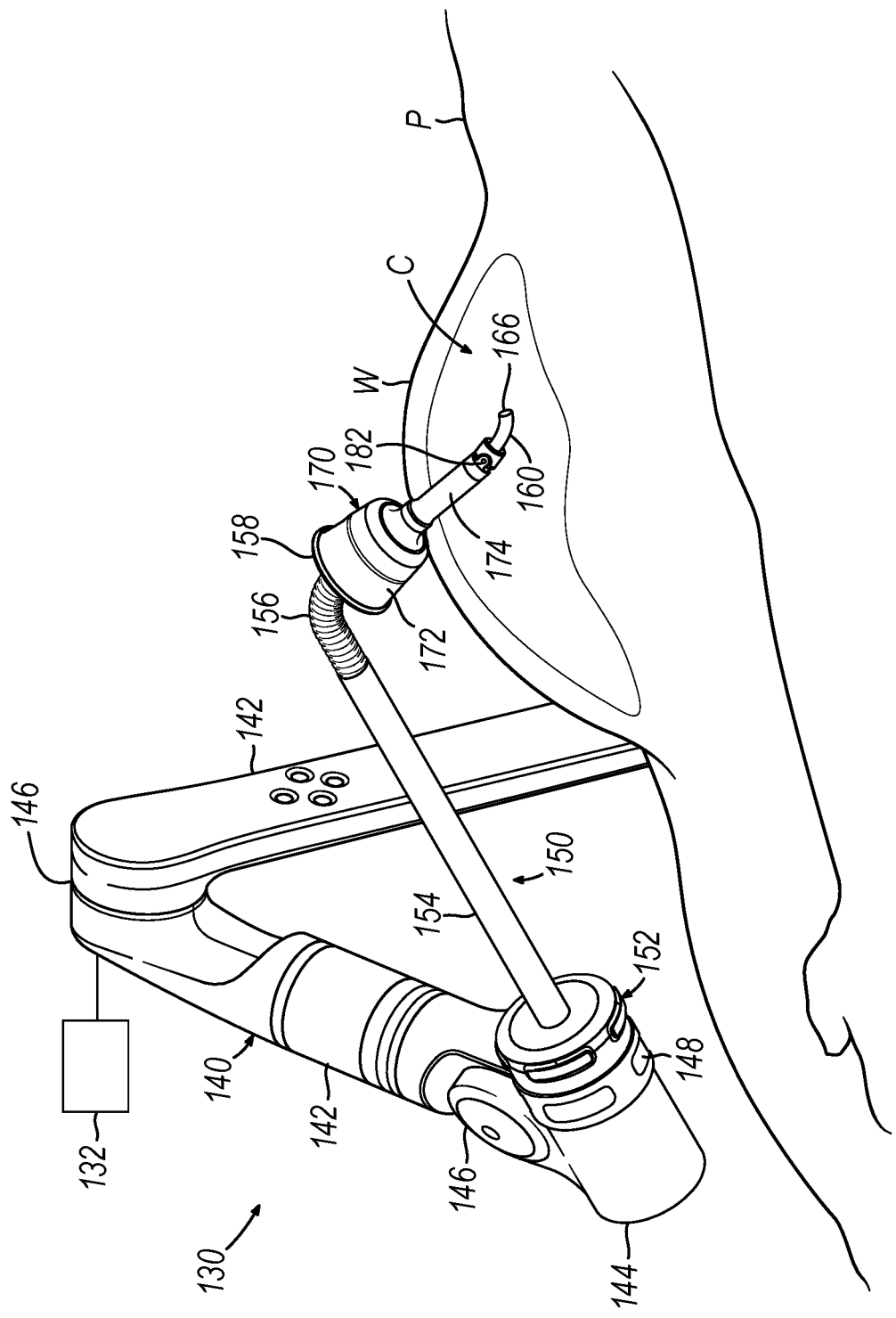
FIG. 8 depicts a perspective view of another example of a robotic system having a robotic arm, a surgical scope having a deflectable distal shaft portion, and a cannula having an articulation feature.

FIG. 8 shows an example of a robotic system (130) that includes a robotic arm (140), a surgical instrument in the form of a surgical scope (150) removably coupled to a head (144) of robotic arm (140), and a surgical access device in the form of a cannula (170) coupled with surgical scope (150) remotely from head (144). Robotic arm (140) includes arm segments (142) and head (144) that are interconnected by movable joints (146), where head (144) includes a motorized drive mechanism (148) that may be similar to instrument driver (66) described above. Robotic arm (140) is operable to selectively position and orient surgical scope (150) relative to a patient (P) by driving arm segments (142) and drive mechanism (148) based on control signals received from a master controller (132) of robotic system (130), shown schematically. Master controller (132) may be operatively coupled with robotic arm (140), including surgical scope (150), via a wired connection or a wireless connection, for example.

Robotic arm (140) may be similar in structure and function to any of robotic arms (20, 32) described above, and is mountable to any suitable arm support structure such as a column (22) or any of the other arm support structures disclosed above or in the patent references incorporated by reference herein. Though not shown, robotic system (130) may further include one or more additional robotic arms (140) each supporting and controlling a respective surgical instrument having an end effector of which surgical scope (150) may provide visualization within a body cavity (C) of the patient (P).

Figure 9:
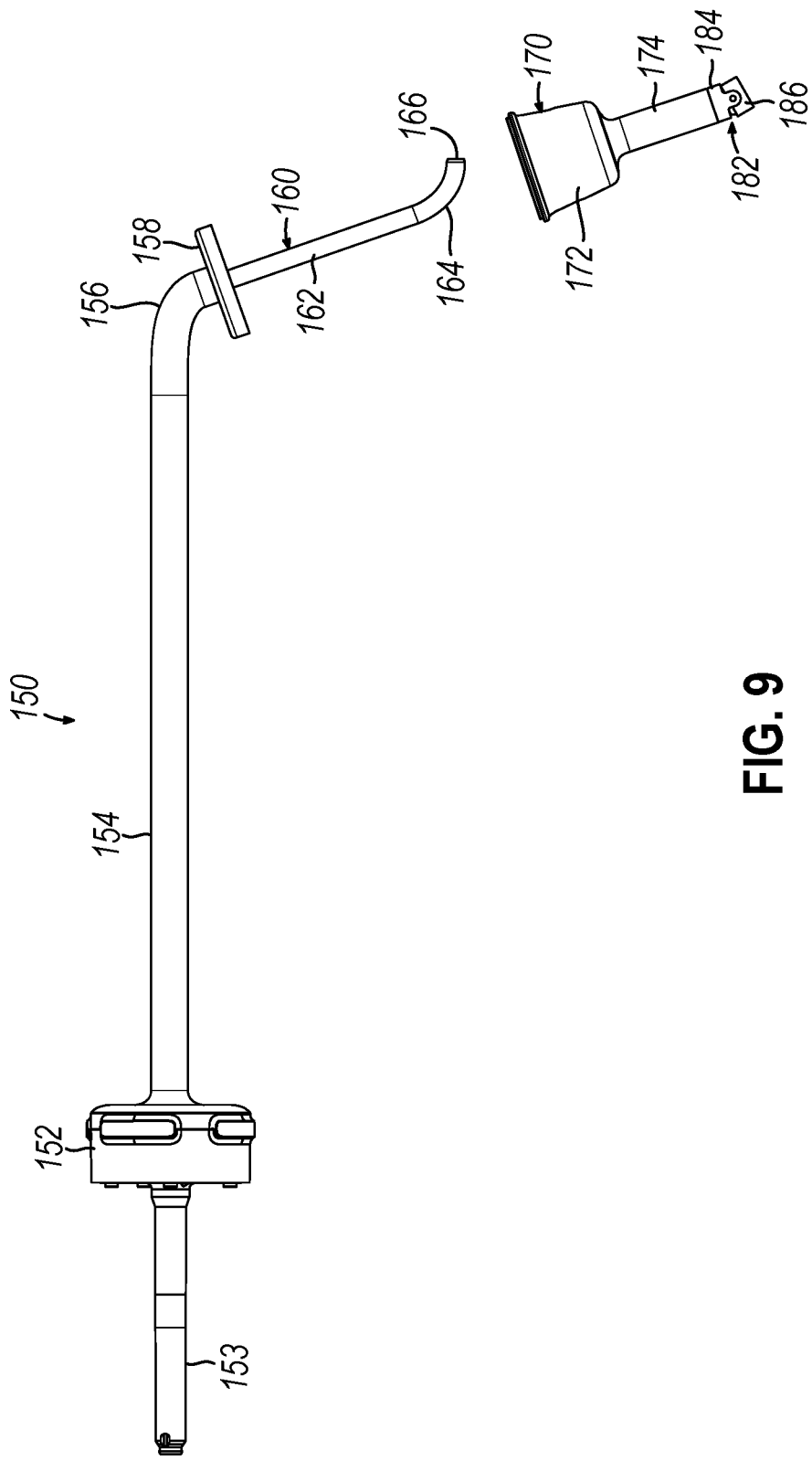
FIG. 9 depicts a schematic side elevational view of the surgical scope and the cannula of FIG. 8.

As shown in FIGS. 8 and 9, surgical scope (150) includes a scope base (152), an elongate rigid outer sheath (154) that extends distally from scope base (152), a flexible joint (156) at a distal end of outer sheath (154), a cannula docking plate (158) at a distal end of flexible joint (156), and a scope shaft (160) slidably disposed within outer sheath (154). Flexible joint (156) may have a predefined curved shape or be configured to assume a curved shape as shown and may include an internal sheath (not shown) that resists binding. Similar to scope shaft (108) described above, scope shaft (160) includes a deflectable distal shaft portion (162) that includes an articulation section (164). Scope base (152) may be similar to instrument base (76) described above in that scope base (152) is configured to attach to drive mechanism (148) of robotic arm head (144) such that drive inputs of scope base (152) operatively couple with respective drive outputs of drive mechanism (148). Scope base (152) includes an elongate cylindrical extension (153) (also referred to as a nosecone) that extends coaxially through a central clearance bore (not shown) of drive mechanism (148). Drive mechanism (148) is operable to drive insertion (i.e., longitudinal advancement and retraction) and articulation of scope shaft (160) relative to outer sheath (154). In some versions, drive mechanism (148) may also be further operable to drive articulation of cannula (170), described below.

As shown in FIGS. 8-11, cannula (170) includes a proximal structure in the form of a cup (172) having an open proximal end, and a distal structure in the form of an elongate tube (174) that extends distally from a distal end of cup (172) and has a smaller maximum outer diameter than cup (172). A distal end of cup (172) tapers radially inwardly to the proximal end of tube (174). In the present version, both of cup (172) and tube (174) are rigid such that neither is configured to deflect laterally during use when tube (174) is deployed in a body wall (W). In other versions, all or a portion of tube (174) may be laterally deflectable (e.g., flexible).

As shown in FIG. 11, the interiors of cup (172) and tube (174) cooperate to define a working channel (176) that extends along a central primary axis (A1) of cannula (170) and is sized and configured to receive and guide scope shaft (160) of surgical scope (150) longitudinally therethrough into body cavity (C). A proximal lip of cup (172) is configured to releasably couple with cannula docking plate (158) of surgical scope (150) such that the open proximal end of cup (172) is enclosed by docking plate (158). A distal portion of an annular sidewall of cup (172) includes an access port (178) that communicates with working channel (176). In some versions, access port (178) may be configured to couple with a source of insufflation gas, such as pressurized air, for directing the gas into or out of body cavity (C) to regulate insufflation of body cavity (C). Additionally, or alternatively, access port (178) may be configured to receive various other fluids and/or surgical instruments. Cup (172) further includes an inner seal member (180) (shown schematically) configured to establish an air-tight seal against scope shaft (160) when scope shaft (160) is positioned within working channel (176), and also when scope shaft (160) is removed from working channel (176), to thereby maintain insufflation of body cavity (C) during a procedure. In other versions, cannula (170) and/or surgical scope (150) may include one or more additional seal members configured to maintain insufflation of body cavity (C).

In addition to the foregoing, cannula (170) may be constructed and operable in accordance with at least some of the teachings of U.S. Pat. No. 10,792,069, entitled "Trocar Seal Assemblies," issued Oct. 6, 2020; U.S. Pat. No. 10,820,924, entitled "Asymmetric Shaft Seal," issued Nov. 3, 2020; U.S. Pub. No. 2021/0338272, entitled "Pinch to Release Cannula Depth Limiter," published Nov. 4, 2021; and/or U.S. Pat. No. 10,939,937, entitled "Trocar with Oblique Needle Insertion Portion and Perpendicular Seal Latch," issued Mar. 9, 2021. The disclosures of these references are incorporated by reference herein, in their entirety.

Cannula (170) further includes an articulation feature in the form of an articulation joint (182) at the distal end of tube (174). Similar to distal sheath (106) of surgical scope (100), articulation joint (182) is configured to facilitate in positioning a distal tip section (166) of surgical scope shaft (160) at a desired location and orientation within body cavity (C) to visualize the target surgical site. Articulation joint (182) of the present example includes a rigid proximal link (184) that is affixed to a distal end of tube (174), and a rigid distal link (186) pivotably coupled with proximal link (184) about a pivot axis that extends transversely to primary axis (A1) of cannula (170). Accordingly, articulation joint (182) of the present version is configured to articulate in a single plane that includes primary axis (A1) to orient distal link (186) along an articulated secondary axis (A2) that is angled relative to primary axis (A1), as shown in FIG. 11. In other versions, distal link (186) may be configured to pivot relative to proximal link (184) about one or more additional pivot axes, and/or articulation joint (182) may include one or more additional links pivotably coupled with proximal and distal links (184, 186) about non-parallel pivot axes, such that articulation joint (182) is configured to articulate in two or more planes that intersect one another and include or extend parallel to primary axis (A1).

Articulation of articulation joint (182) may be active or passive. For instance, articulation joint (182) may be driven by drive mechanism (148) of robotic arm head (144) via one or more articulation drivers (not shown), such as one or more tendons (e.g., pull-wires, drive bands, etc.); or by another drive mechanism positioned remotely from robotic arm head (144), for example as described below. Alternatively, articulation joint (182) may be configured to passively assume an articulated state in response to scope shaft (160) being driven into an articulated state at its articulation section (164). In some such versions, articulation joint (182) may be resiliently biased toward a straight configuration in which distal link (186) is coaxial with primary axis (A1) of cannula (170). In other versions, articulation joint (182) may be manipulated by hand into an articulated state before insertion through body wall (W), and it may be configured to maintain such a preset articulated state. As another variation, another instrument (e.g., grasper) within the cavity (C) may be used to manipulate articulation joint (182) in the patient (P).

Figure 12A:
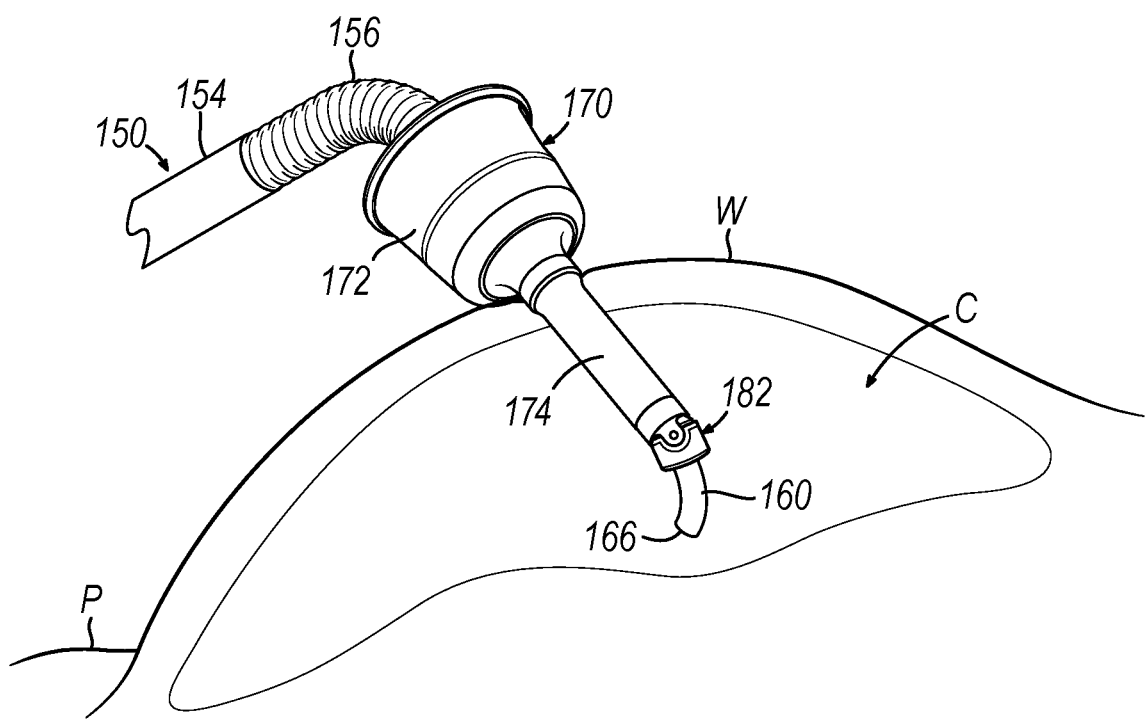
FIG. 12A depicts a perspective view of the surgical scope and the cannula of FIG. 8 inserted into the body cavity of a patient, showing the articulation feature in a first articulated state and the deflectable distal shaft portion in a first deflected state.

As shown in FIG. 12A, cannula tube (174) is inserted through body wall (W), for example using an obturator (not shown), such that at least the distal end of cannula tube (174) is positioned within body cavity (or "intracorporeally") and cup (172) is positioned external to body cavity (C) (or "extracorporeally"). In versions where an obturator is used during insertion through body wall (W), the obturator may be removed from cannula tube (174) before surgical scope shaft (160) is inserted through cannula tube (174). As shown in FIG. 8, robotic arm (140) and its head (144) are positioned remotely from cannula (170) such that outer sheath (154) drapes away from cannula (170) via the flexibility of flexible joint (156), thus generally clearing the workspace directly above body wall (W) for use by other robotic arms (not shown) supporting other surgical instruments. In some procedures, cannula (170) may be stabilized relative to the patient with a mechanical grounding feature (not shown), such as a stationary arm. Such a stationary arm may be secured to table (16, 34) or some other grounding structure.

Figure 12B:
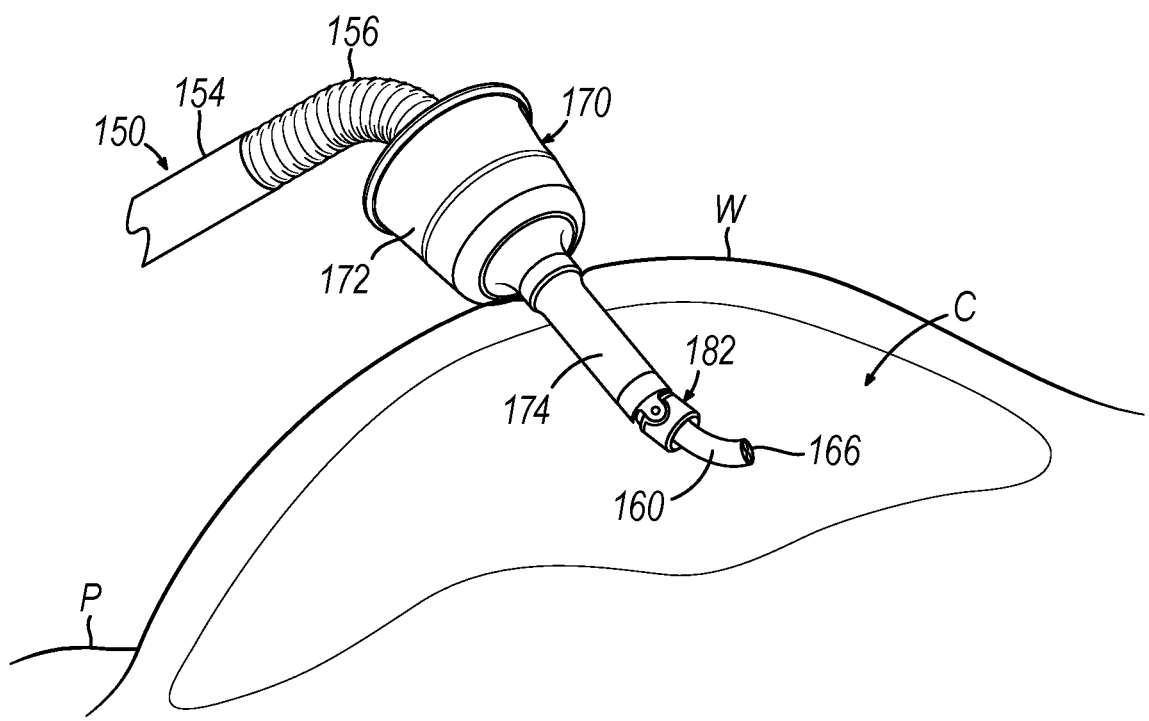
FIG. 12B depicts a perspective view of the surgical scope and the cannula of FIG. 12A, showing the articulation feature in a second articulated state and the deflectable distal shaft portion in a second deflected state.
Figure 12C:
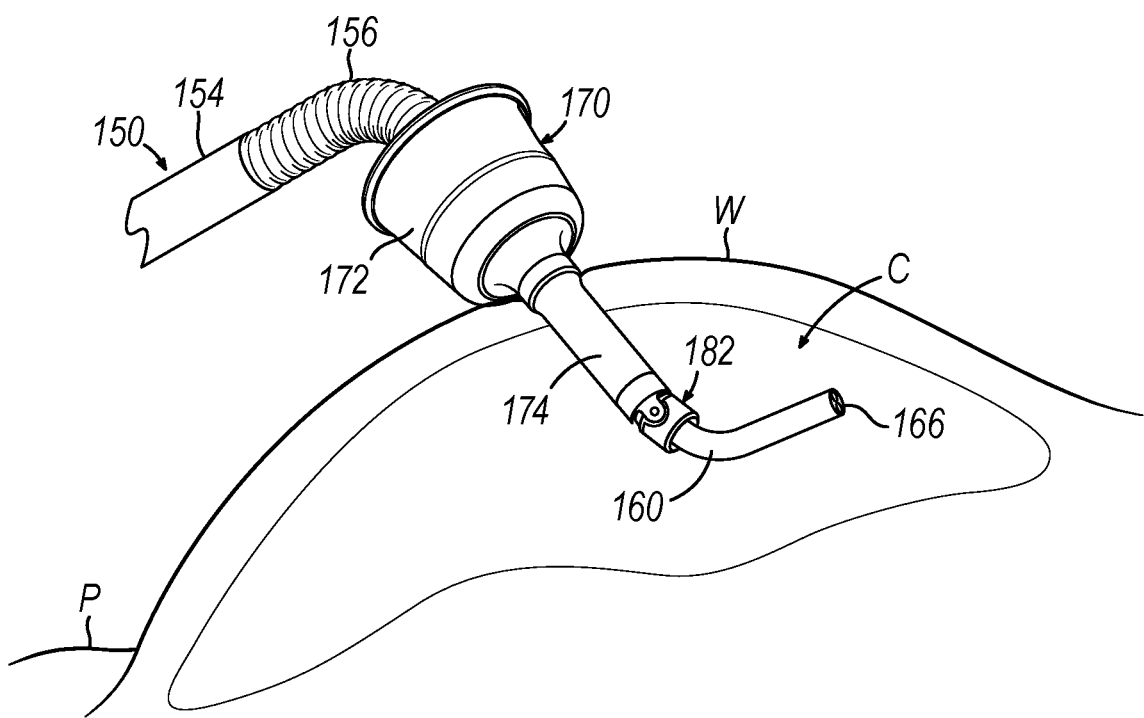
FIG. 12C depicts a perspective view of the surgical scope and the cannula of FIG. 12A, showing the deflectable distal shaft portion inserted further into the body cavity.
Figure 12D:
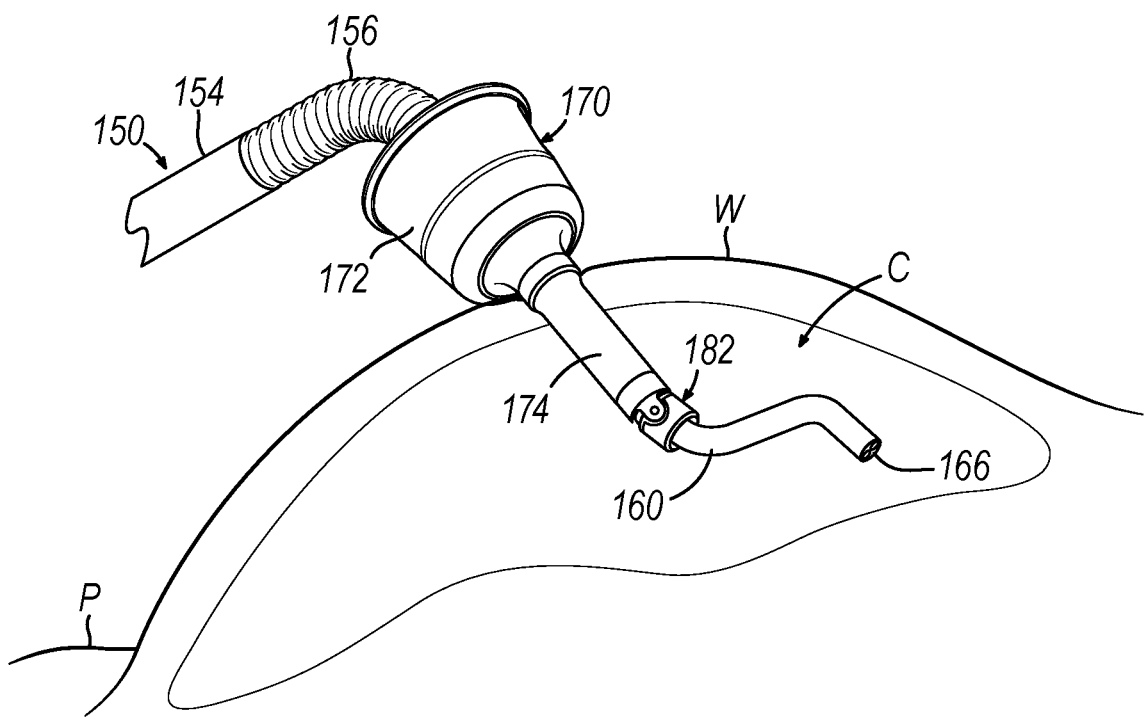
FIG. 12D depicts a perspective view of the surgical scope and the cannula of FIG. 12A, showing a distal end of the deflectable distal shaft portion in an articulated state.

As shown in FIGS. 12A-12D, scope shaft (160) is actuated by drive mechanism (148) distally through cannula (170) and into body cavity (C). FIG. 12A shows articulation joint (182) in a first example of an articulated state in which articulation joint (182) directs scope shaft (160) in a first angled direction within body cavity (C). FIG. 12B shows articulation joint (182) in a second example of an articulated state in which articulation joint (182) directs deflectable scope shaft (160) in a second angled direction within body cavity. As noted above, articulation joint (182) may be configured to transition between such articulated states actively or passively. In cases of active cannula articulation, deflectable distal shaft portion (162) may be flexible along its length to conform to the curvature defined by articulation joint (182) as scope shaft (160) is inserted further into body cavity (C), as shown particularly in FIG. 12C. As shown in FIG. 12D, scope shaft (160) may be articulated at its distal articulation section (164) to suitably orient its distal tip section (166) within body cavity (C) to provide visualization of the target surgical site and/or surrounding anatomical structures. In the example shown in FIG. 12D, scope shaft (160) has achieved a dogleg bend configuration, though scope shaft (160) may alternatively achieve any other suitable kind of articulated state, including but not limited to different articulated states with two or more bends regions at different corresponding positions along the length of scope shaft (160).

IV. Robotic System with Zone-Limited Control of Robotic Arm Head

In some surgical procedures, robotic arm (140) may be paired with a surgical scope having a scope shaft and/or an outer sheath that is rigid along a full distance that spans between robotic arm head (144) and the corresponding cannula. Such a configuration may not allow for a proximal portion of the surgical scope to be draped away and located remotely from the cannula, such as shown in FIG. 8. Instead, the rigid configuration of the surgical scope may require that head (144), the cannula, and the surgical scope shaft remain in coaxial alignment throughout the surgical procedure. As a result, where robotic system (130) includes multiple robotic arms (140) manipulating respective surgical instruments within the same workspace above the patient, there may be a need to limit the range of motion of one or more of the surgical arms within the workspace to minimize the risk of collision between heads (144) and their surgical instruments. Accordingly, it may be desirable to control heads (144) to travel within the workspace in a manner that maximizes reach and access of the surgical scope and other surgical instruments while also minimizing risk of collision within the workspace.

A. Overview of Robotic System with Zone-Limited Control

Figure 13:
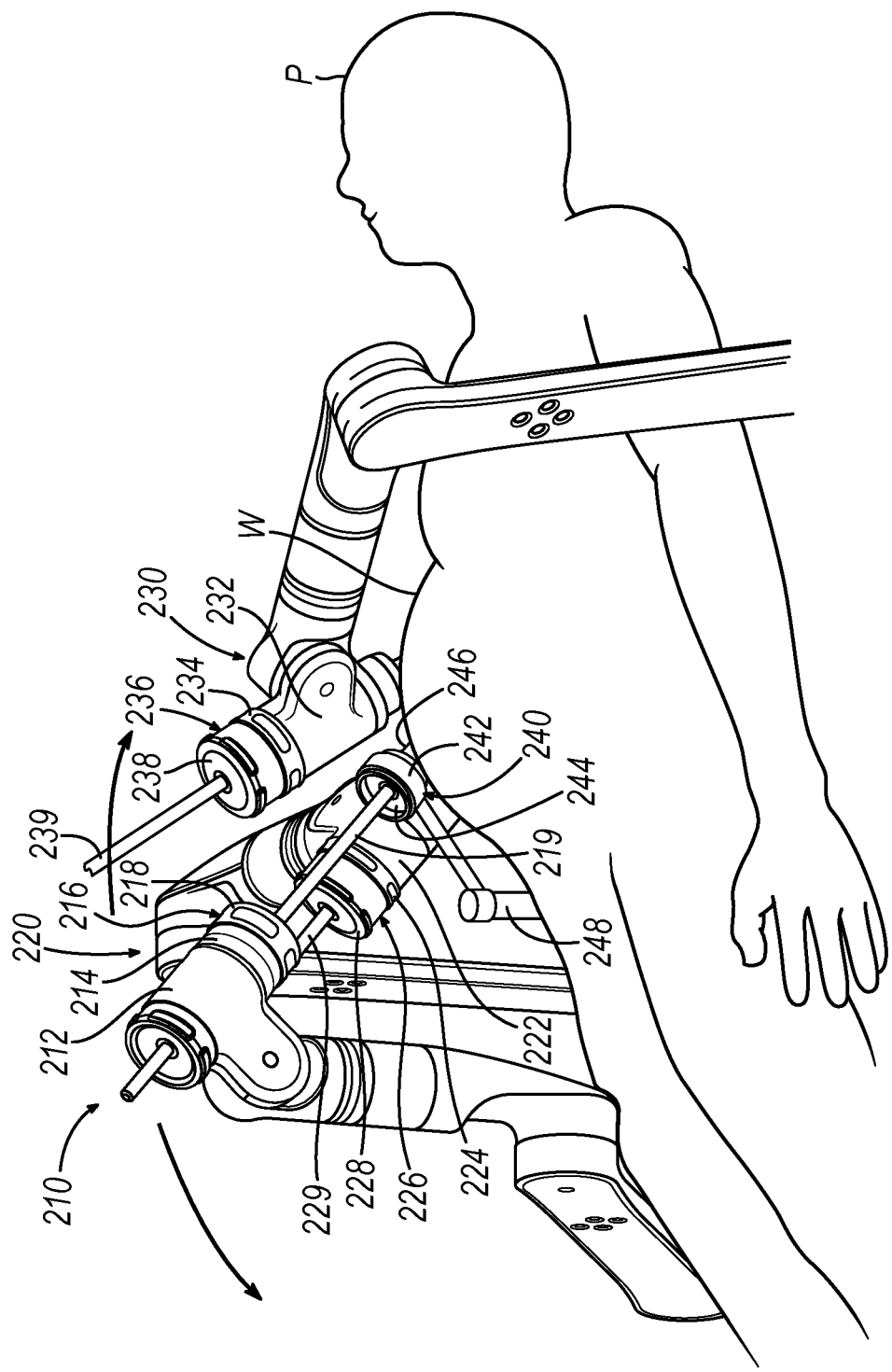
FIG. 13 depicts a perspective view of another example of a robotic system having a first robotic arm that controls a surgical scope, and second and third robotic arms that each controls another respective surgical instrument.

FIG. 13 shows another example of a robotic system (200) that is similar to robotic system (130) except as otherwise described below. Robotic system (200) includes a master controller (not shown) similar to master controller (132), and a first robotic arm (210), a second robotic arm (210), and a third robotic arm (230) each in communication with and controllable by the master controller to cooperate to perform a surgical procedure on patient (P). Robotic system (200) may include various other quantities of robotic arms in other versions.

Each robotic arm (210, 220, 230) includes a head (212, 222, 232) configured to support a respective surgical instrument, and a motorized drive mechanism (214, 224, 234) operable to drive the surgical instrument in response to control signals received from the master controller. In particular, a first surgical instrument (216) is releasably coupled to and manipulatable by first head (212) of first robotic arm (210); a second surgical instrument (226) is releasably coupled to and manipulatable by second head (222) of second robotic arm (220); and a third surgical instrument (236) is releasably coupled to and manipulatable by third head (232) of third robotic arm (230). Each surgical instrument (216, 226, 236) includes a base (218, 228, 238) operatively coupled with the respective drive mechanism (214, 224, 234), and an elongate rigid shaft (219, 229, 239) extending concentrically through and actuatable by its base (218, 228, 238). An insertion depth of each instrument shaft (219, 229, 239) within body cavity (C) may be adjusted by actuating the shaft (219, 229, 239) linearly by the respective drive mechanism (214, 224, 234), and/or by articulating the respective robotic arm (210, 220, 230) to adjust a height of the respective head (212, 222, 232) relative to the body wall (W) of patient (P).

First surgical instrument (216) is shown in the form of a surgical scope having a distal tip section that includes an optical module having a distally facing lens operable to provide visualization of a target surgical site within body cavity (C) of patient (P). Each of second and third surgical instruments (226, 236) includes an end effector operable to grasp tissue, cut tissue, staple tissue, seal tissue, suture tissue, and/or provide other functionality at the target surgical site. Scope shaft (219) is guided distally into body cavity (C) via a cannula (240) that is positioned in body wall (W). Cannula (240) may be similar to cannula (170) described above and includes a cup (242) having an inner seal member (244) configured to sealingly engage scope shaft (219), and a tube (246) (also referred to as a "sheath") that extends distally from a tapered distal end of cup (242). Cannula (240) may be stabilized relative to patient (P) by a mechanical grounding feature shown in the form of a stationary arm (248) which may be secured to table (16, 34) or some other stationary structure. Though not shown, one or both of second and third surgical instruments (226, 236) may also be guided into body cavity (C) by a respective cannula.

Scope shaft (219) of the present version is rigid along at least its proximal portion that remains external to patient (P). In some versions, scope shaft (219) may include a deflectable distal shaft portion that includes an articulation sections, similar to deflectable distal shaft portion (162) that is configured to articulate in one or more planes. Though not shown, surgical scope (216) may further include a proximal camera unit fixed at a proximal end of scope shaft (219), for example as disclosed in U.S. Pat. App. No. 17/941,063, entitled "Articulating Introducer Cannula for Endoscope in Robotic System," filed on Sep. 9, 2022, issued Sep. 30, 2025 as U.S. Pat. No. 12,426,772, the disclosure of which is incorporated by reference herein, in its entirety.

Figure 14:
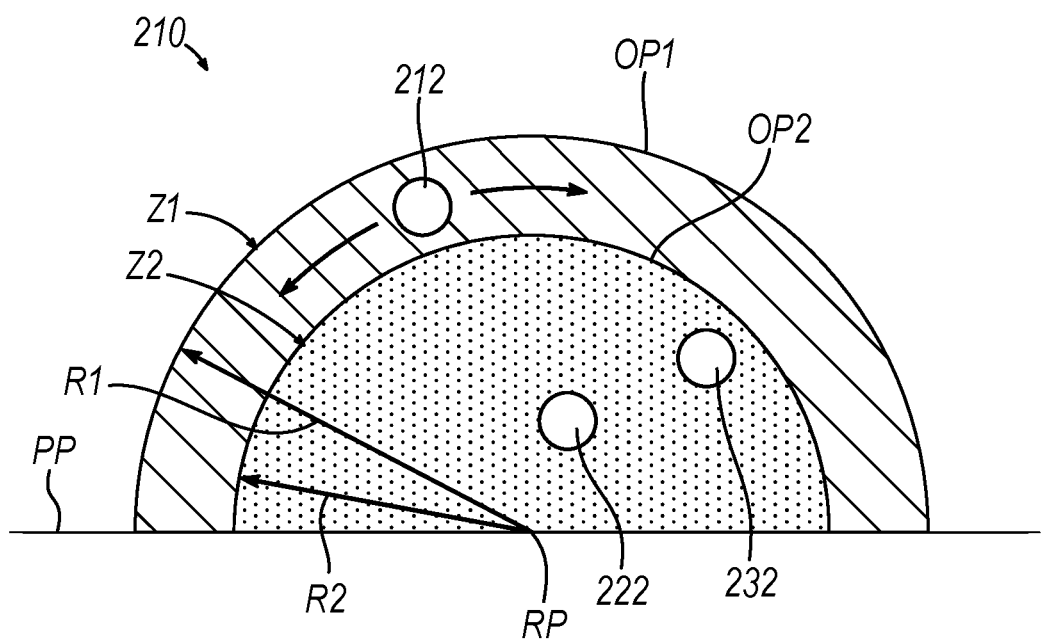
FIG. 14 depicts a schematic view of heads of the robotic arms of the robotic system of FIG. 13 located within a robotic arm workspace that overlies the patient, showing the first head constrained to a first predefined zone of the robotic arm workspace, and showing the second and third heads constrained to a second predefined zone of the robotic arm workspace.

To maximize the reach and access of surgical scope (216) and surgical instruments (216, 226, 236) within body cavity (C) while also minimizing the risk of collision between their external proximal portions and between their respective heads (212, 222, 232), robotic arms (210, 220, 230) may be controlled by the master controller to constrain the movements of heads (212, 222, 232) to predefined zones within the robotic arm workspace above body wall (W). As shown in FIGS. 13 and 14, first head (212) may be constrained to a first predefined zone (Z1) above a patient plane (PP) defined by body wall (W), and each of second and third surgical instruments (226, 236) may be constrained to a second predefined zone (Z2) above patient plane (PP). First zone (Z1) overlies second zone (Z2) in a non-overlapping manner such that second zone (Z2) is positioned between first zone (Z1) and patient plane (PP).

As shown in FIG. 14, each predefined zone (Z1, Z2) may be shaped generally semi-spherically and concentrically with respect to a reference point (RP) within patient plane (PP). In some instances, reference point (RP) may correspond to a remote center of motion ("RCM") of cannula (240) or of an access device associated with one of surgical instruments (226, 236). First zone (Z1) includes an arcuate first outer perimeter (OP1) defined by a first radius (R1) measured from the reference point (RP), and second zone (Z2) includes an arcuate second outer perimeter (OP2) defined by a second radius (R2) measured from the reference point (RP), where the first radius (R1) is greater than the second radius (R2). In other versions, zones (Z1, Z2) may be formed with various other shapes and with corresponding outer perimeters (OP1, OP2) that are shaped arcuately in whole, in part, or not at all. In any such versions, first head (212) may be controlled by the master controller to execute arcuate movements within first zone (Z1) without entering second zone (Z2). Simultaneously, second and third heads (222, 232) may be controlled by the master controller to execute movements within second zone (Z2) without entering first zone (Z1). In this manner, the master controller may ensure that first head (212) and surgical scope (216) do not collide with second or third heads (222, 232) or with the extracorporeal proximal portions of their respective surgical instruments (226, 236).

One or more parameters of each predefined zone (Z1, Z2), such as size, shape, and location, may be determined prior to the surgical procedure by the master controller based on one more inputs provided by an operator, such as via a user console of robotic system (200). Such user inputs may be considered by the master controller in combination with sensor readings received from one or more sensors of robotic system (200) that monitor patient (P) and/or that track the location and orientation of robotic arms (210, 220, 230), surgical scope (216), and surgical instruments (226, 236) relative to patient (P). In some instances, one or more parameters of a predefined zone (Z1, Z2) may be adjusted by the master controller during a surgical procedure based on a change in sensed conditions or based on a user input provided during the procedure.

B. Handheld Surgical Scope with Poka-Yoke Adapter

As described above, surgical scope (216) includes a scope base (218) that is configured to be mounted directly to robotic arm head (212) such that scope shaft (219) is actuatable relative to scope base (218) by drive mechanism (214) of robotic arm (210). In some instances, it may be desirable to configure robotic arm head (212) to accept a surgical scope that is configured to handheld use, while still controlling the position of robotic arm head (212) in the manner described above.

Figure 15:
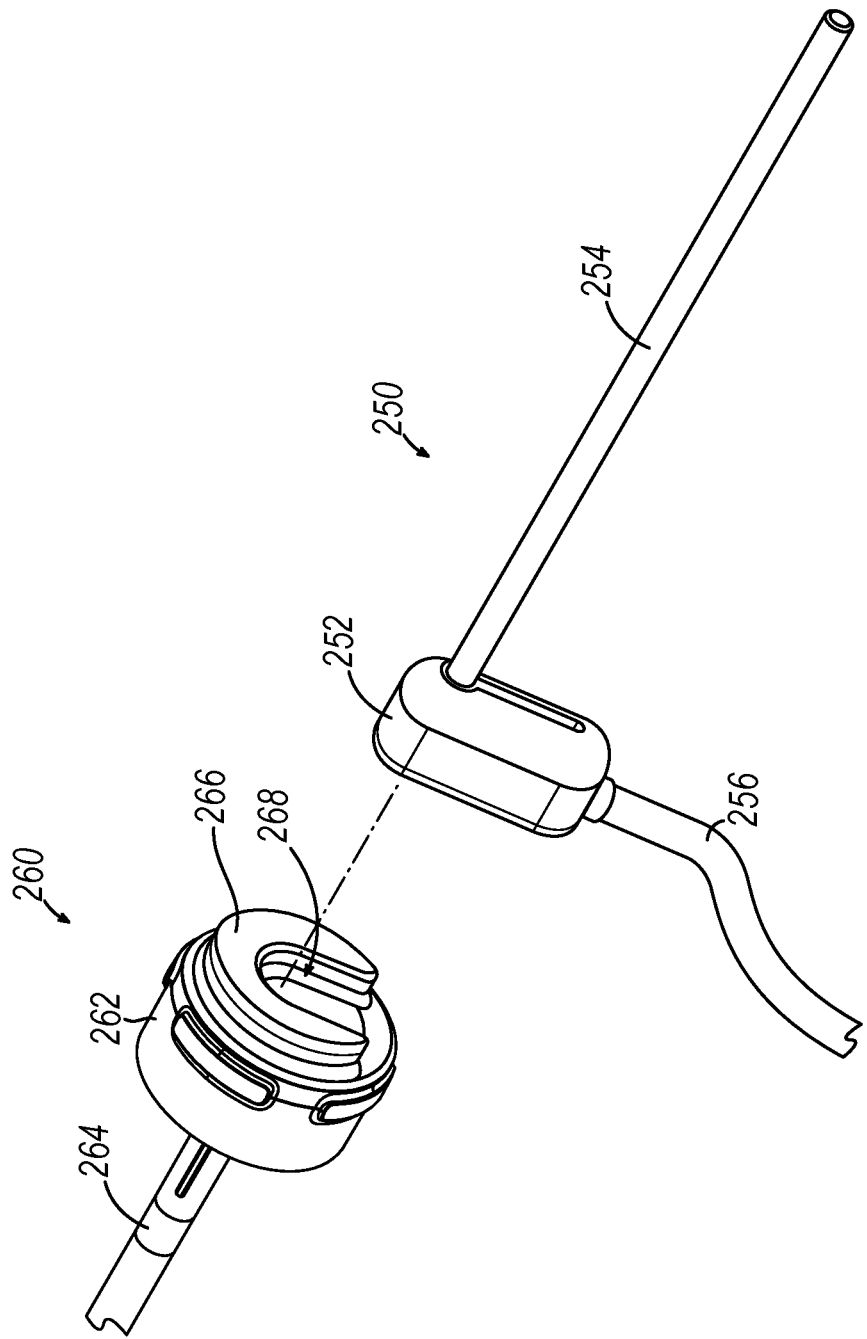
FIG. 15 depicts a perspective view of another example of a surgical scope and an adapter configured for use with the robotic system of FIG. 13, showing the surgical scope separated from the adapter.

FIG. 15 shows an example of a surgical scope (250) that includes a scope base (252) having an elongate oval shape that is sized and configured to be gripped by a single hand of a user. A rigid scope shaft (254) extends distally from an underside of scope base (252) at one of its elongate ends. Scope shaft (254) may include a deflectable distal shaft portion similar to deflectable distal shaft portion (162) described above that is configured to articulate within body cavity (C). Surgical scope (250) further includes an outer sheath (256) that connects at its distal end to a sidewall of scope base (252) at an elongate end opposed from the end at which scope shaft (254) extends. Outer sheath (256) may be flexible and configured to couple at its proximal end to another component of robotic system (200) that enables surgical scope (250) to communicate with a user interface.

Figure 16:
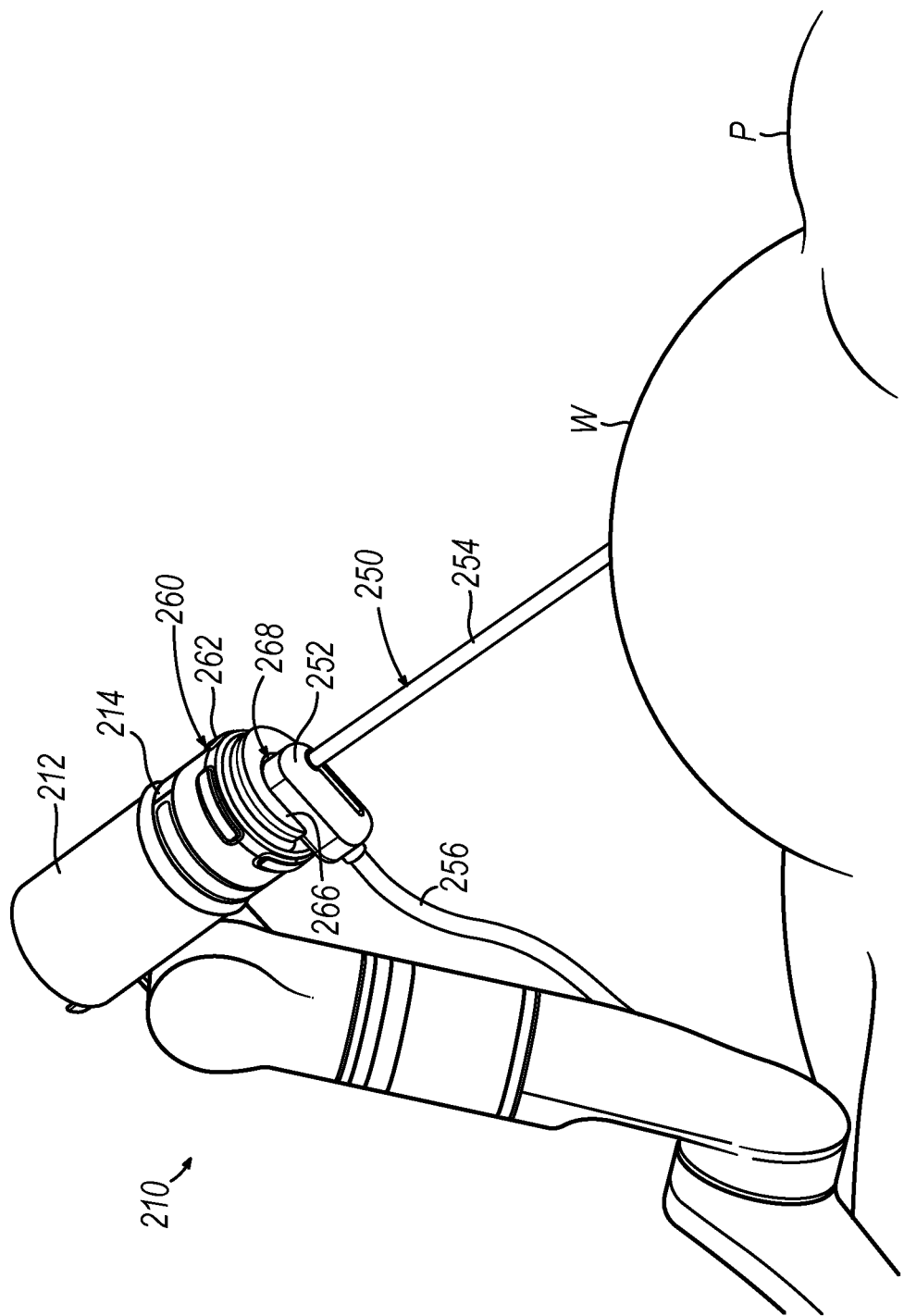
FIG. 16 depicts a perspective view of the surgical scope and the adapter of FIG. 15 mounted to the first robotic arm of the robotic system of FIG. 13.

As shown in FIGS. 15-16, surgical scope (250) is coupled to robotic arm head (212) by an adapter (260). Adapter (260) is shaped similar to scope base (152) and includes an a disc-shaped adapter base (262) and an elongate cylindrical extension (264) (also referred to as a nosecone) that extends proximally from a proximal end of adapter base (262) and is configured to extend coaxially through a central clearance bore of drive mechanism (214). A distal end of adapter base (262) includes a U-shaped yoke (266) that protrudes distally and defines a recess (268) configured to slidably receive scope base (252) in a direction transverse to a longitudinal axis of adapter (260). Yoke (266) is shaped to complement an outer contour of scope base (252) to permit attachment of surgical scope (250) and inhibit attachment of other types of surgical instruments, such that adapter (260) functions as a poka-yoke feature. Yoke (266) may be configured to releasably retain scope base (252) frictionally and/or with additional latching features.

Upon attachment of surgical scope (250) to robotic arm (210) via adapter (260), surgical scope (250) may be adjustably positioned relative to patient (P) by robotic arm (210) while head (212) is constrained to the first predefined zone (Z1) as described above. Additionally, because scope shaft (254) is immovably affixed to scope base (252), an insertion depth of scope shaft (254) may be controlled by articulating robotic arm (210) to adjust a height of head (212) relative to body wall (W).

V. Examples of Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A system, comprising: (a) a controller; (b) a robotic arm in communication with the controller and having a head; and (c) a surgical scope coupled with the head and having a scope shaft sized and configured to be inserted through an opening in a body wall and into a body cavity of a patient, wherein the controller is programmed to control the robotic arm to manipulate the surgical scope relative to the patient while inhibiting the head from entering a predefined zone of a robotic arm workspace that overlies the body wall.

Example 2

The system of Example 1, wherein the predefined zone includes an outer perimeter that is arcuate.

Example 3

The system of Example 2, wherein the outer perimeter is defined by a predefined radius that extends from a predefined reference point associated with the patient.

Example 4

The system of any of the preceding Examples, wherein the robotic arm comprises a first robotic arm having a first head, wherein the system further comprises a second robotic arm in communication with the controller and having a second head, and a surgical instrument coupled with the second head and having an instrument shaft sized and configured to be inserted through an opening in the body wall and into the body cavity of the patient, wherein the predefined zone comprises an instrument arm zone, wherein the controller is programmed to control the second robotic arm independently of the first robotic arm to constrain the second head within the instrument arm zone.

Example 5

The system of Example 4, wherein the controller is configured to control the first robotic arm to constrain the first head in a predefined scope arm zone that is arranged in a non-overlapping manner with the instrument arm zone.

Example 6

The system of Example 5, wherein the instrument arm zone is positioned between the patient and the scope arm zone.

Example 7

The system of any of Examples 5 through 6, wherein the scope arm zone has a first outer perimeter that extends to a first maximum distance from a predefined reference point associated with the patient, wherein the instrument arm zone has a second outer perimeter that extends to a second maximum distance from the reference point that is less than the first maximum distance.

Example 8

The system of Example 7, wherein at least a portion of each of the first outer perimeter and the second outer perimeter is arcuate, wherein the portion of the first outer perimeter is defined by a first radius measured from the reference point and the portion of the second outer perimeter is defined by a second radius measured from the reference point that is less than the first radius.

Example 9

The system of any of Examples 5 through 8, wherein the controller is programmed to direct the first and second robotic arms to move the first and second heads within the respective scope arm zone and instrument arm zone simultaneously without collision between the first and second heads or between the surgical scope and the surgical instrument.

Example 10

The system of any of the preceding Examples, wherein the controller is configured to adjust the predefined zone during a surgical procedure on the patient.

Example 11

The system of any of the preceding Examples, wherein the head includes a drive mechanism, wherein the surgical scope includes a scope base coupled to the drive mechanism, wherein the drive mechanism is operable to actuate the scope shaft relative to the scope base.

Example 12

The system of Example 11, wherein the controller is configured to control the robotic arm to move the scope shaft relative to the patient by at least one of actuating the scope shaft with the drive mechanism or articulating the robotic arm.

Example 13

The system of any of the preceding Examples, wherein the surgical scope includes a scope base that is shaped and configured for handheld use by a user, wherein the scope shaft extends distally from the scope base, wherein the head of the robotic arm includes an adapter feature having a recess that is shaped and configured to receive the scope base.

Example 14

The system of any of the preceding Examples, wherein the scope shaft includes a deflectable distal shaft portion.

Example 15

The system Example 14, wherein the deflectable distal shaft portion is flexible.

Example 16

A system, comprising: (a) a controller; (b) a first robotic arm in communication with the controller and having a first head; (c) a second robotic arm in communication with the controller and having a second head; (d) a first surgical instrument coupled with the first head and having a first instrument shaft sized and configured to be inserted through an opening in a body wall and into a body cavity of a patient; and (e) a second surgical instrument coupled with the second head and having a second instrument shaft sized and configured to be inserted through the body wall and into the body cavity, wherein the controller is programmed to control the first and second robotic arms independently such that the first head is constrained to a first predefined zone external to the patient and the second head is constrained to a second predefined zone external to the patient, wherein the first and second predefined zones are arranged in a non-overlapping manner.

Example 17

The system of Example 16, wherein the second predefined zone is positioned between the patient and the first predefined zone.

Example 18

A method of operating a robotic system that includes a controller, a robotic arm in communication with the controller and having a head, and a surgical scope coupled with the head and having a scope shaft sized and configured to be inserted through an opening in a body wall and into a body cavity of a patient, the method comprising: (a) defining with the controller a zone that overlies the body wall; and (b)

while a distal end of the scope shaft is positioned within the body cavity, controlling the robotic arm with the controller such that the head moves relative to the patient without the head entering the defined zone.

Example 19

The method of Example 18, wherein the robotic arm comprises a first robotic arm having a first head, wherein the surgical system further includes a second robotic arm having a second head and a surgical instrument coupled with the second head, wherein the method further comprises controlling the second robotic arm with the controller such that the second head is constrained to the defined zone.

Example 20

The method of Example 19, wherein the first head includes a drive mechanism, wherein the surgical scope includes a scope base coupled with the drive mechanism, wherein the method further comprises moving the scope shaft relative to the patient by at least one of actuating the scope shaft with the drive mechanism or articulating the robotic arm.

VI. Miscellaneous

The teachings herein may be combined with any one or more of the teachings disclosed in U.S. Pat. App. No. 17/941,063, entitled "Articulating Introducer Cannula for Endoscope in Robotic System," filed on Sep. 9, 2022, issued Sep. 30, 2025, as U.S. Pat. No. 12,426,772, the disclosure of which is incorporated by reference herein, in its entirety; U.S. Pat. App. No. 17/941,062, entitled "Bent Introducer Cannula for Endoscope in Robotic System," filed on Sep. 9, 2022 published Mar. 14, 2024 as U.S. Pub. No. 2024/0081942, the disclosure of which is incorporated by reference herein, in its entirety; and/or U.S. Pat. App. No. 17/941,063, entitled "Flexible Articulating Introducer Cannula for Surgical Scope in Robotic System," filed on Sep. 9, 2022, published Mar. 14, 2024, as U.S. Pub. No. 2024/0081922, the disclosure of which is incorporated by reference herein, in its entirety.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Some versions of the examples described herein may be implemented using a processor, which may be part of a computer system and communicate with a number of peripheral devices via bus subsystem. Versions of the examples described herein that are implemented using a computer system may be implemented using a general-purpose computer that is programmed to perform the methods described herein. Alternatively, versions of the examples described herein that are implemented using a computer system may be implemented using a specific-purpose computer that is constructed with hardware arranged to perform the methods described herein. Versions of the examples described herein may also be implemented using a combination of at least one general-purpose computer and at least one specific-purpose computer.

In versions implemented using a computer system, each processor may include a central processing unit (CPU) of a computer system, a microprocessor, an application-specific integrated circuit (ASIC), other kinds of hardware components, and combinations thereof. A computer system may include more than one type of processor. The peripheral devices of a computer system may include a storage subsystem including, for example, memory devices and a file storage subsystem, user interface input devices, user interface output devices, and a network interface subsystem. The input and output devices may allow user interaction with the computer system. The network interface subsystem may provide an interface to outside networks, including an interface to corresponding interface devices in other computer systems. User interface input devices may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system.

In versions implemented using a computer system, a storage subsystem may store programming and data constructs that provide the functionality of some or all of the modules and methods described herein. These software modules may be generally executed by the processor of the computer system alone or in combination with other processors. Memory used in the storage subsystem may include a number of memories including a main random-access memory (RAM) for storage of instructions and data during program execution and a read only memory (ROM) in which fixed instructions are stored. A file storage subsystem may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem in the storage subsystem, or in other machines accessible by the processor.

In versions implemented using a computer system, the computer system itself may be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the example of the computer system described herein is intended only as a specific example for purposes of illustrating the technology disclosed. Many other configurations of a computer system are possible having more or fewer components than the computer system described herein.

As an article of manufacture, rather than a method, a non-transitory computer readable medium (CRM) may be loaded with program instructions executable by a processor. The program instructions when executed, implement one or more of the computer-implemented methods described above. Alternatively, the program instructions may be loaded on a non-transitory CRM and, when combined with appropriate hardware, become a component of one or more of the computer-implemented systems that practice the methods disclosed.

Versions described above may be designed to be disposed of after a single use, or they can be designed to be used multiple times. Versions may, in either or both cases, be reconditioned for reuse after at least one use. Reconditioning may include any combination of the steps of disassembly of the systems, instruments, and/or portions thereof, followed by cleaning or replacement of particular pieces, and subsequent reassembly. In particular, some versions of the systems, instruments, and/or portions thereof may be disassembled, and any number of the particular pieces or parts of the systems, instruments, and/or portions thereof may be selectively replaced or removed in any combination. Upon cleaning and/or replacement of particular parts, some versions of the systems, instruments, and/or portions thereof may be reassembled for subsequent use either at a reconditioning facility, or by an operator immediately prior to a procedure. Those skilled in the art will appreciate that reconditioning of systems, instruments, and/or portions thereof may utilize a variety of techniques for disassembly, cleaning/replacement, and reassembly. Use of such techniques, and the resulting reconditioned systems, instruments, and/or portions thereof, are all within the scope of the present application.

By way of example only, versions described herein may be sterilized before and/or after a procedure. In one sterilization technique, the systems, instruments, and/or portions thereof is placed in a closed and sealed container, such as a plastic or TYVEK bag. The container and system, instrument, and/or portion thereof may then be placed in a field of radiation that can penetrate the container, such as gamma radiation, x-rays, or high-energy electrons. The radiation may kill bacteria on the system, instrument, and/or portion thereof and in the container. The sterilized systems, instruments, and/or portions thereof may then be stored in the sterile container for later use. Systems, instruments, and/or portions thereof may also be sterilized using any other technique known in the art, including but not limited to beta or gamma radiation, ethylene oxide, or steam.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:
1. A system, comprising:
(a) a controller;
(b) a first robotic arm in communication with the controller and having a first head;
(c) a surgical scope coupled with the first head and having a scope shaft sized and configured to be inserted through an opening in a body wall and into a body cavity of a patient;
(d) a second robotic arm in communication with the controller and having a second head; and
(e) a surgical instrument coupled with the second head and having an instrument shaft sized and configured to be inserted through an opening in the body wall and into the body cavity of the patient;
wherein the controller is programmed to control the first robotic arm to manipulate the surgical scope relative to the patient while inhibiting the first head from entering a predefined zone of a robotic arm workspace that overlies the body wall, wherein the predefined zone comprises an instrument arm zone, wherein the controller is programmed to control the second robotic arm independently of the first robotic arm to constrain the second head within the instrument arm zone, wherein the controller is configured to control the first robotic arm to constrain the first head in a predefined scope arm zone that is arranged in a non-overlapping manner with the instrument arm zone,
wherein the instrument arm zone is positioned between the patient and the scope arm zone.

2. The system of claim 1, wherein the predefined zone includes an outer perimeter that is arcuate.

3. The system of claim 2, wherein the outer perimeter is defined by a predefined radius that extends from a predefined reference point associated with the patient.

4. The system of claim 1, wherein the scope arm zone has a first outer perimeter that extends to a first maximum distance from a predefined reference point associated with the patient, wherein the instrument arm zone has a second outer perimeter that extends to a second maximum distance from the reference point that is less than the first maximum distance.

5. The system of claim 4, wherein at least a portion of each of the first outer perimeter and the second outer perimeter is arcuate, wherein the portion of the first outer perimeter is defined by a first radius measured from the reference point and the portion of the second outer perimeter is defined by a second radius measured from the reference point that is less than the first radius.

6. The system of claim 5, wherein the controller is programmed to direct the first and second robotic arms to move the first and second heads within the respective scope arm zone and instrument arm zone simultaneously without collision between the first and second heads or between the surgical scope and the surgical instrument.

7. The system of claim 1, wherein the controller is configured to adjust the predefined zone during a surgical procedure on the patient.

8. The system of claim 1, wherein the first head includes a drive mechanism, wherein the surgical scope includes a scope base coupled to the drive mechanism, wherein the drive mechanism is operable to actuate the scope shaft relative to the scope base.

9. The system of claim 8, wherein the controller is configured to control the first robotic arm to move the scope shaft relative to the patient by at least one of actuating the scope shaft with the drive mechanism or articulating the first robotic arm.

10. The system of claim 1, wherein the surgical scope includes a scope base that is shaped and configured for handheld use by a user, wherein the scope shaft extends distally from the scope base, wherein the first head of the first robotic arm includes an adapter feature having a recess that is shaped and configured to receive the scope base.

11. The system of claim 1, wherein the scope shaft includes a deflectable distal shaft portion.

12. The system of claim 11, wherein the deflectable distal shaft portion is flexible.

13. The system of claim 1, wherein the instrument arm zone is defined by a first radius extending from a reference point, the reference point being associated with the body wall, such that the controller is programmed to prevent the second head from moving beyond the first radius.

14. The system of claim 13, the scope arm zone being defined between the first radius and a second radius, such that the controller is programmed to prevent the first head from moving beyond the second radius and within the first radius.

15. The system of claim 13, further comprising a cannula configured for insertion through the body wall, the canula defining a lumen sized to receive the surgical scope.

16. The system of claim 15, the controller being configured to define a remote center of motion of the cannula, the reference point corresponding to the remote center of motion.

17. The system of claim 1, the instrument arm zone being concentrically positioned relative to the scope arm zone.

18. A system, comprising:
(a) a controller;
(b) a first robotic arm in communication with the controller and having a first head;
(c) a second robotic arm in communication with the controller and having a second head;
(d) a first surgical instrument coupled with the first head and having a first instrument shaft sized and configured to be inserted through an opening in a body wall and into a body cavity of a patient; and
(e) a second surgical instrument coupled with the second head and having a second instrument shaft sized and configured to be inserted through the body wall and into the body cavity,
wherein the controller is programmed to control the first and second robotic arms independently such that the first head is constrained to a first predefined zone external to the patient and the second head is constrained to a second predefined zone external to the patient,
wherein the first and second predefined zones are arranged in a non-overlapping manner,
wherein the second predefined zone is positioned between the patient and the first predefined zone.

19. A method of operating a robotic system that includes a controller, a first robotic arm in communication with the controller and having a first head, a surgical scope coupled with the first head and having a scope shaft sized and configured to be inserted through an opening in a body wall and into a body cavity of a patient, a second robotic arm in communication with the controller and having a second head, and a surgical instrument coupled with the second head, the method comprising:
defining with the controller a first zone that overlies the body wall, the first zone extending between a first radius from a reference point associated with the body wall to a second radius from the reference point;
defining with the controller a second zone that overlies the body wall, the second zone being positioned between the first radius and the body wall;
while a distal end of the scope shaft is positioned within the body cavity, controlling the first robotic arm with the controller such that movement of the first head relative to the patient is constrained to the first zone, such that the first head is unable to enter the second zone; and
while a distal end of the surgical instrument is positioned within the body cavity, controlling the second robotic arm with the controller such that movement of the second head relative to the patient is constrained to the second zone, such that the second head is unable to enter the first zone.

20. The method of claim 19, wherein the first head includes a drive mechanism, wherein the surgical scope includes a scope base coupled with the drive mechanism, wherein the method further comprises moving the scope shaft relative to the patient by at least one of actuating the scope shaft with the drive mechanism or articulating the first robotic arm.

* * * * *